(12) United States Patent
Carter

(10) Patent No.: US 6,553,350 B2
(45) Date of Patent: Apr. 22, 2003

(54) METHOD AND APPARATUS FOR PRICING PRODUCTS IN MULTI-LEVEL PRODUCT AND ORGANIZATIONAL GROUPS

(75) Inventor: Thomas J. Carter, Austin, TX (US)

(73) Assignee: Trilogy Development Group, Inc., Austin, TX (US)

( * ) Notice: Subject to any disclaimer, the term of this patent is extended or adjusted under 35 U.S.C. 154(b) by 0 days.

(21) Appl. No.: 09/253,427

(22) Filed: Feb. 19, 1999

(65) Prior Publication Data

US 2002/0026368 A1 Feb. 28, 2002

Related U.S. Application Data

(63) Continuation of application No. 08/664,837, filed on Jun. 17, 1996, now Pat. No. 5,878,400.

(51) Int. Cl.[7] .............................................. G06F 17/60
(52) U.S. Cl. ......................................... 705/20; 705/10
(58) Field of Search ................................ 705/1, 10–14, 705/20, 26, 27

(56) References Cited

U.S. PATENT DOCUMENTS

| | | | |
|---|---|---|---|
| 3,806,711 A | | 4/1974 | Cousins, Jr. |
| 5,053,957 A | | 10/1991 | Suzuki |
| 5,224,034 A | | 6/1993 | Katz et al. |
| 5,774,868 A | * | 6/1998 | Cragun et al. ................. 705/10 |
| 5,987,423 A | * | 11/1999 | Arnold et al. ................. 705/10 |

FOREIGN PATENT DOCUMENTS

| WO | WO 00/65505 | * | 11/2000 |
|---|---|---|---|

OTHER PUBLICATIONS

"Trilogy Debuts PriceBUILDER Software to Provide Sophisticated Pricing," Business Wire, Aug. 1, 1995.

Matt Nannery, "The Vanguard of Technology," Supermarket news, p. 15, Dec. 6, 1993.

Karen D. Moser, "Trilogy System to Ease Design of POS Apps," PC Week, vol. 9, no. 11, pp. 61–62.

Automating and Integrating the Sales Function: How to Profit From Complexity and Customization Enterprise Integration Strategies, vol. 9, no. 11.

Parenti, Mark "Expert Systems Move Manufacturing software into the 90s," DIALOG (R) File 148: IAC Trade and Industry Database, Penton Publishing, Inc., 1991.

* cited by examiner

*Primary Examiner*—Frantzy Poinvil

(57) ABSTRACT

The system organize various pricing tables and price adjustment tables and various products and purchasing organizations based on "who" (i.e. which purchasing organization) is purchasing "what" (i.e. which product). The system and method utilizes a denormalized table to relate the "who" to the "what" using denormalized numbers. The system and method organizes various purchasing organizations and products into hierarchical tables. These hierarchical tables are called organizational groups and product groups. Various price adjustments may be specified for each level of the organizational groups and product groups hierarchies. The price adjustments for a particular purchasing organization are determined by retrieving the price adjustments for that particular purchasing organization as well as the price adjustments for organizational groups above the particular purchasing organization in the organizational groups hierarchy. Likewise, the price adjustments for a particular product are determined by retrieving the price adjustments for that particular product as well as the price adjustments for product groups above the particular product in the product groups hierarchy. The system and method the various pricing adjustments applicable to a particular product offered to a particular purchasing group based on several criteria. After the sorting is accomplished the pricing adjustments are applied in sequence to arrive at a final price at which a particular product can be sold to a particular purchasing organization.

31 Claims, 15 Drawing Sheets

FIG. 1
PRIOR ART

| WHO \ WHAT | 486/33 CPU | 486/50 CPU | 486/66 CPU |
|---|---|---|---|
| ADAM | $40 | $60 | $80 |
| BOB | $42 | $58 | $72 |
| CHARLIE | $44 | $68 | $92 |

FIG. 2
PRIOR ART

| WHO \ WHAT | 486/33 CPU | 486/50 CPU | 486/66 CPU |
|---|---|---|---|
| ADAM | 10% | 12% | 14% |
| BOB | 8% | 16% | 22% |
| CHARLIE | 15% | 5% | 2% |

FIG. 8

PriceBUILDER Maintenance

Pricing Types

| Unit | Description | Operation_ID | User | Target | Op |
|---|---|---|---|---|---|
| 25 | All-Quote Discount | Percentage | True | <none> | QU |
| 28 | All-Quote Rebates | Fixed Amount | True | <none> | QU |
| 27 | All-Quote Shipping Charges | Fixed Amount | True | <none> | QU |
| 17 | Base Cost | Price Override | True | Base Cost | <n |
| 21 | Cost-Plus Operation | Percentage | True | <none> | <n |
| 24 | Currency Conversion Factor | Factor Charge | True | <none> | <n |
| 9 | Currency Conversion Percentage | Percentage | True | <none> | <n |
| 12 | Customer Discount | Percentage | True | <none> | <n |
| 18 | Customer Negotiated Discount | Percentage | True | <none> | <n |
| 7 | Customer Negotiated Price | Price Override | True | <none> | <n |
| 14 | Discount off List Price | Percentage | True | List Price | <n |
| 19 | Freight Charges by Weight | Fixed Amount | True | <none> | Gro |
| 10 | General Discount | Percentage | True | <none> | <n |
| 11 | General Uplift | Percentage | True | <none> | <n |
| 20 | Give it to them for Cost | Price Override | True | Base Cost | <n |
| 15 | Gross Profit Calculation | Gross Profit | True | <none> | <n |
| 16 | Gross Profit off List Price | Gross Profit | True | List Price | MA |
| 23 | Higher of Cost or Customer | Percentage | True | <none> | <n |
| 1 | List Price | Price Override | True | <none> | Min |
| 22 | Lower of Cost or Customer Specific | Percentage | True | <none> | <n |
| 3 | Maintenance | Fixed Amount | True | <none> | <n |
| 25 | Maximum Discount | Price Override | True | <none> | <n |
| 2 | Program Discount | Percentage | True | <none> | <n |
| 8 | Rebate | Fixed Amount | True | <none> | <n |
| 4 | Shipping Charges | Fixed Amount | True | <none> | <n |
| 5 | Tax | Percentage | True | <none> | <n |
| 6 | Tiered Pricing | Price Override | True | <none> | <n |
| 29 | Total Historical Volume Discount | Percentage | True | <none> | <n |
| 13 | Volume Discount | Percentage | True | <none> | <n |

[ New Pricing Type ]  [ Refresh ]  [ Delete Selected ]  [ Save All ]

Pricing Sequence  [ 1-Full Sequence ▼ ]  [ Delete Sequence ] [ Rename ]

[ New ]  [ Save ]

| Description | Target |
|---|---|
| List Price | |
| Currency Conversion Percentage | |
| Currency Conversion Factor | |
| Customer Negotiated Discount | |
| Customer Negotiated Price | |

[ Drop Above ]  [ Drop Below ]  [ Delete Step ]

Prod Detail | Adj Detail | Cost Detail | Prods & Adjs | Customers | Testing | Procedures | Integrity | Extras

FIG. 14

METHOD AND APPARATUS FOR PRICING PRODUCTS IN MULTI-LEVEL PRODUCT AND ORGANIZATIONAL GROUPS

This is a continuation of application Ser. No. 08/644,837 filed Jun. 17, 1996 now U.S. Pat. No. 5,878,400.

BACKGROUND OF THE INVENTION

1. Field of the Invention

This invention relates to the field of computer-based pricing of products.

2. Background Art

Many business enterprises use field sales representatives to initiate, negotiate, and consummate sales transactions with customers. These sales representatives compete with sales representatives from other business enterprises. Sales representatives would prefer to conclude the sales transaction as completely as possible while meeting with the customer. However, it is often not possible to provide timely pricing information to potential customers at the time of the transaction.

As is explained below, there are large amounts of data that must be stored and used to provide accurate pricing for sales transactions. As a result, many companies maintain pricing information in a large central database. Sales representatives must access the database at the home office remotely through network access or by communicating with another person at the home office. The sales representative provides product information as input and receives pricing data as output. The sales representative then communicates this pricing information to the potential customer, often days after the sales meeting occurred. A delay in providing such critical data as pricing to a potential client can be fatal to the transaction, reducing sales.

The large amounts of data required to provide accurate pricing is understood by describing the factors that go into pricing. For many enterprises pricing is typically performed on a customer by customer basis. That is, for a particular product, each customer gets a price that is different from the price offered to other customers (in the present application the term "product" is used generically to refer to tangible products as well as intangible products, such as services). The difference in price for a particular product is a function of numerous factors. The type of product (e.g., hardware, software, or a particular service), the size of the customer, the type of customer organization (e.g., a wholesaler, distributor, or value added reseller), and the customer's geographic location are only a few of many factors that are used to determine a price recommendation for a sales representative.

Assuming that each product is sold at a unique price to a particular purchasing organization (the term "purchasing organization" refers to a single person as well as to purchasing entities such as companies and the like), conventional price determination methods tabulate the price for each product sold to a certain purchasing organization into a price table. For example, if the selling organization has ten thousand different products and there are ten thousand different purchasers, the price table would have one hundred million (i.e., ten thousand multiplied by ten thousand) entries.

Each product may have several attributes that contribute to pricing differential. The weight or size of a product could increase its base shipping cost. The product may be priced differently when it is sold separately instead of as part of a system. If there are ten possible attributes for the same product, the price table described above would have one billion entries. Further, for each product there are usually various adjustments to the basic price. For example, there are usually applicable state and local taxes, actual shipping charges, currency conversions, and a number of possible discounts. If there are ten different types of price adjustments for the same product for a given customer, the size of the table would grow to ten billion entries.

Each category of possible price adjustments has its own sub-adjustments. For example, the adjustment category of discounts includes different types of discounts (i.e. sub-adjustments). The different types of discounts can be a volume discount, a general purchase agreement discount, a time-limited discount effective for purchases within a certain date range, an initial offer discount, and so forth. If there are ten different types of discounts for each product or customer, the size of the price table would grow to one hundred billion entries.

In the prior art, a large mainframe computer database contains the price table ("mainframe computer" refers to any computer with a large database). The customer order is entered in a central billing and financing system within the mainframe computer. The mainframe computer then performs the pricing calculation according to the price tables stored in the database.

The following discussion provides a specific example of various tables used in the conventional pricing system discussed above. FIG. 1 shows an example of a basic price table. Each row in the table designates a potential customer that the product would be sold to, and each column designates the product will be sold, and the table entry corresponding to the basic unadjusted price for the product. In the example of FIG. 1, a 486/33 CPU is sold to Adam at a price of $40, a 486/50 CPU is sold to Adam at a price of $60 and a 486/66 CPU is sold to Adam at a price of $80. A 486/33 CPU is sold to Bob at a price of $42, a 486/50 CPU is sold to Bob at $58, and a 486/66 CPU is sold to Bob at $72. Thus, as the basic price table of FIG. 1 indicates, each particular product is sold to each customer at a price that is different from the price that the same product is sold to another customer.

According to the prior art, in addition to the basic price table of FIG. 1, various other tables must be stored and maintained in the mainframe database. For example, FIG. 2 shows a volume discount table that corresponds to the basic price table of FIG. 1. Thus, the price $40 would be reduced by a discount of 10% if Adam purchases 486/33 CPU's in volume. Thus, Adam can purchase each 486/33 CPU at a volume-discounted price of $40*(1−(10/100)), i.e. at $36, as compared with the original price $40. Similarly, a volume discount of 12% corresponds to the original price $60, and a volume discount of 14% corresponds to the original price of $80, and so forth.

A pricing application called R3 made by SAP has the prior art disadvantages explained above. For example, R3 requires a number of price adjustment tables and a number of database queries to retrieve applicable price adjustments. Likewise, an order entry application made by Oracle has a similar shortcoming in that a number of database queries are required to retrieve various price adjustments from a large number of price adjustment tables.

The prior art has attempted to provide more responsive pricing systems by providing sales representatives with price tables on portable computers that can be looked up during a sales transaction. However, current portable computers do not have the storage capacity for all of the price tables that are stored on the central database. As a result, the pricing generated by the portable computers may not be reliable, potentially costing the selling company money when the prices are two low, and potentially causing lost sales opportunities when the prices generated are too high.

SUMMARY OF THE INVENTION

The present invention is a method and apparatus for determining prices for various products offered to various purchasing organizations (in the present application the term "purchasing organization" refers to a single person as well as to purchasing entities such as companies and the like). As stated above, in the present application the term "product" is used generically to refer to tangible products well as intangible products, such as services. The invention overcomes the prior art's difficulty in storing, maintaining, and retrieving the large amounts of data required to apply pricing adjustments to determine prices for various products. Because of the invention's method and apparatus, prices for a large number of products can be determined by a laptop computer and the prior art's need to utilize a mainframe computer is alleviated.

The invention operates under the paradigm of WHO (the purchasing organization) is buying WHAT (the product). In the invention the WHO is defined by creating an organizational hierarchy of organizational groups, where each group represents a characteristic of the organizational group. One or more customers (i.e. purchasing organizations) may be members of each organizational group and each customer may be a member of more than one organizational group.

When a customer is selected in the present invention, all of the groups to which that customer belongs, and all pricing adjustments for which each group is eligible, are identified. For example, when the "customer type" group to which a particular customer belongs is identified, all of the pricing adjustments applicable to that customer type are applied to that particular customer. This allows pricing rules to be based on characteristics of each organizational group instead of basing the rules on a per-customer basis.

Similarly, a product group hierarchy is defined that can be applied to products. For example, a "hardware" product group may be defined that may include as members a number of products. Special pricing adjustments may be defined as applying to all hardware products. When a product is selected using the invention, all product groups to which the product belongs, and all applicable pricing adjustments, are identified.

The price adjustments for a particular purchasing organization are determined by retrieving the price adjustments for that particular purchasing organization as well as the price adjustments for other organizational groups that are above the particular purchasing organization in the organizational groups hierarchy. Likewise, the price adjustments for a particular product are determined by retrieving the price adjustments for that particular product as well as the price adjustments for other product groups that are above the particular product in the product groups hierarchy. The invention sorts the various pricing adjustments applicable to a particular product offered to a particular purchasing organization based on several criteria. After the sorting is accomplished the pricing adjustments are applied in sequence to arrive at a final price at which a particular product can be sold to a particular purchasing organization.

The combination of organizational groups and product groups hierarchies and the denormalized pricing table relating a particular organization (or an entire organizational group) to a particular product (or an entire product group) result in some of the advantages of the present invention over the prior art pricing systems. These advantages enable the method and apparatus of the present invention to overcome the prior art's need to store, maintain, and retrieve huge amounts of data required to determine prices for various products offered to various purchasing organizations while applying a large number of price adjustments. The invention also overcomes the disadvantages of having to "hard-code" the "business logic" into the pricing system. In other words, the invention provides for flexibility in formulating a desired pricing system while reducing the prior art need to store, maintain, and retrieve huge amounts of data.

BRIEF DESCRIPTION OF THE DRAWINGS

FIG. 1 illustrates a basic price table according to the prior art.

FIG. 2 shows a prior art volume discount table corresponding to the basic price table of FIG. 1.

FIG. 8 is another example of user specified pricing types and user specified pricing sequence.

FIG. 14 is another example of a computer screen according to the present invention showing pricing adjustment details for a geographical organizational group and a product group, using a Tax pricing type.

DETAILED DESCRIPTION OF THE INVENTION

A method and apparatus for pricing products in multi-level product and organizational groups is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

Figure 3:
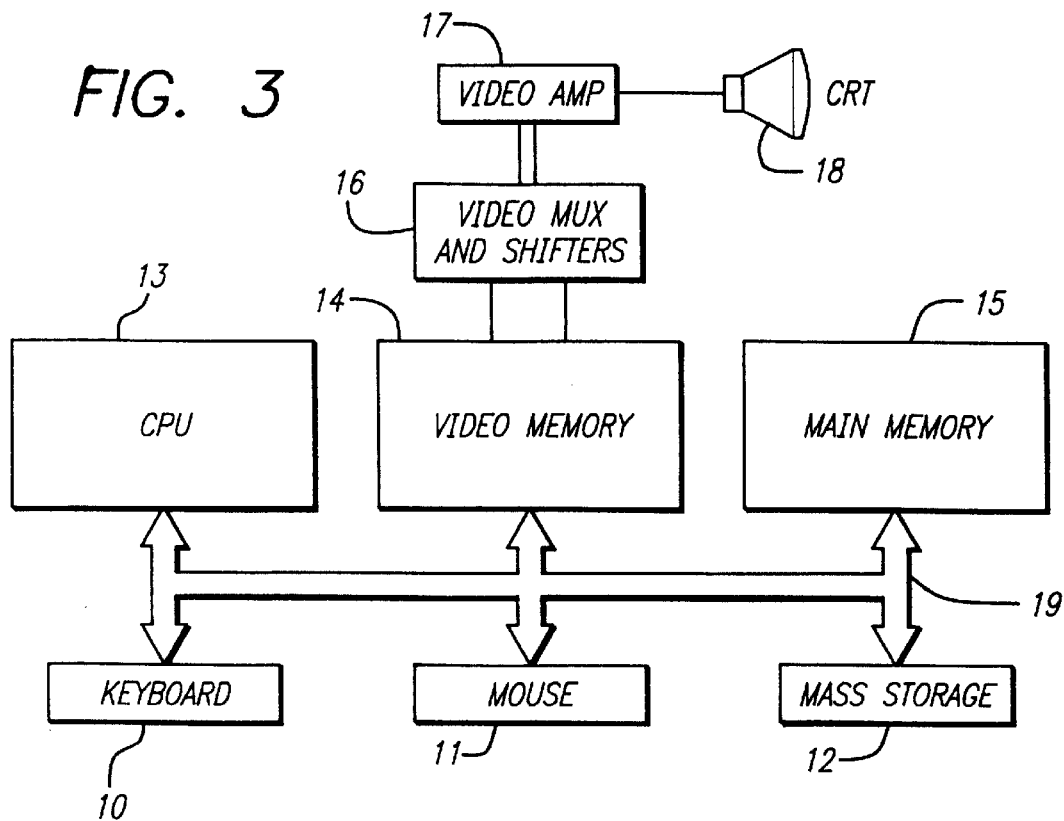
FIG. 3 shows an example of a computer system used to generate price recommendations according to the present invention.

The present invention may be implemented on any conventional or general purpose computer system. An example of one embodiment of a computer system for implementing this invention is illustrated in FIG. 3. A keyboard 10 and mouse 11 are coupled to a bi-directional system 19. The keyboard and mouse are for introducing user input to the computer system and communicating that user input to CPU 13. The computer system of FIG. 3 also includes a video memory 14, main memory 15 and mass storage 12, all coupled to bi-directional system bus 19 along with keyboard 10, mouse 11 and CPU 13. The mass storage 12 may include both fixed and removable media, such as magnetic, optical or magneto-optical storage systems or any other available mass storage technology. The mass storage may be shared on a network, or it may be a dedicated mass storage. Bus 19 may contain, for example, 32 address lines for addressing video memory 14 or main memory 15. The system bus 19 also includes, for example, a 32-bit data bus for transferring data between and among the components, such as CPU 13, main memory 15, video memory 14 and mass storage 12. Alternatively, multiplexed data/address lines may be used instead of separate data and address lines.

In one embodiment of the invention, the CPU 13 is a 32-bit microprocessor manufactured by Motorola, such as the 68030 or 68040. However, any other suitable microprocessor or microcomputer may be utilized. The Motorola microprocessor and its instruction set, bus structure and control lines are described in MC68030 User's Manual, and MC68040 User's Manual, published by Motorola Inc. of Phoenix, Ariz. Main memory 15 is typically comprised of random access memory (RAM) and in the preferred embodiment of this invention, comprises 8 megabytes of memory. More or less memory may be used without departing from the scope of this invention. Video memory 14 is a dual-ported video random access memory (RAM), and in this invention consists, for example, of 256 kbytes of memory. However, more or less video memory may be provided as well. One port of the video memory 14 is coupled to video multiplexer and shifter 16, which in turn is coupled to video amplifier 17. The video amplifier 17 is used to drive the cathode ray tube (CRT) raster monitor 18. Video multiplexing shifter circuitry 16 and video amplifier 17 are well known in the art and may be implemented by any suitable means. This circuitry converts pixel data stored in video memory 14 to a raster signal suitable for use by monitor 18. Monitor 18 is a type of monitor suitable for displaying graphic images.

The computer system described above is for purposes of example only. The present invention may be implemented in any type of computer system or programming or processing environment. For example, in one embodiment, the invention's pricing system is implemented on a server in a computer network. In that case, no keyboard, mouse, or display is required to implement the present invention. In this embodiment, the invention is typically implemented with the aid of a laptop or otherwise remote terminal or computer which communicates with the server via a wired or wireless connection. For example, the communication between the laptop computer and the server can be accomplished through a cellular modem.

As stated above, the invention overcomes the prior art's disadvantages in storing, maintaining, and retrieving large amounts of data. The invention operates under a simple paradigm of WHO (the purchasing organization) is buying WHAT (the product). In the invention the WHO is defined by creating an organizational hierarchy of purchasing organizations. A "purchasing organization" (also referred to as a customer) may be a single person. For example, Adam in FIG. 1 is a purchasing organization. A purchasing organization may also be a larger entity, such as a company. One or more customers (i.e. purchasing organizations) may be members of each organizational group and each customer may be a member of more than one organizational group. Similarly, one or more products may be members of each product group and each product may be a member of more than one product group.

Figure 4A:
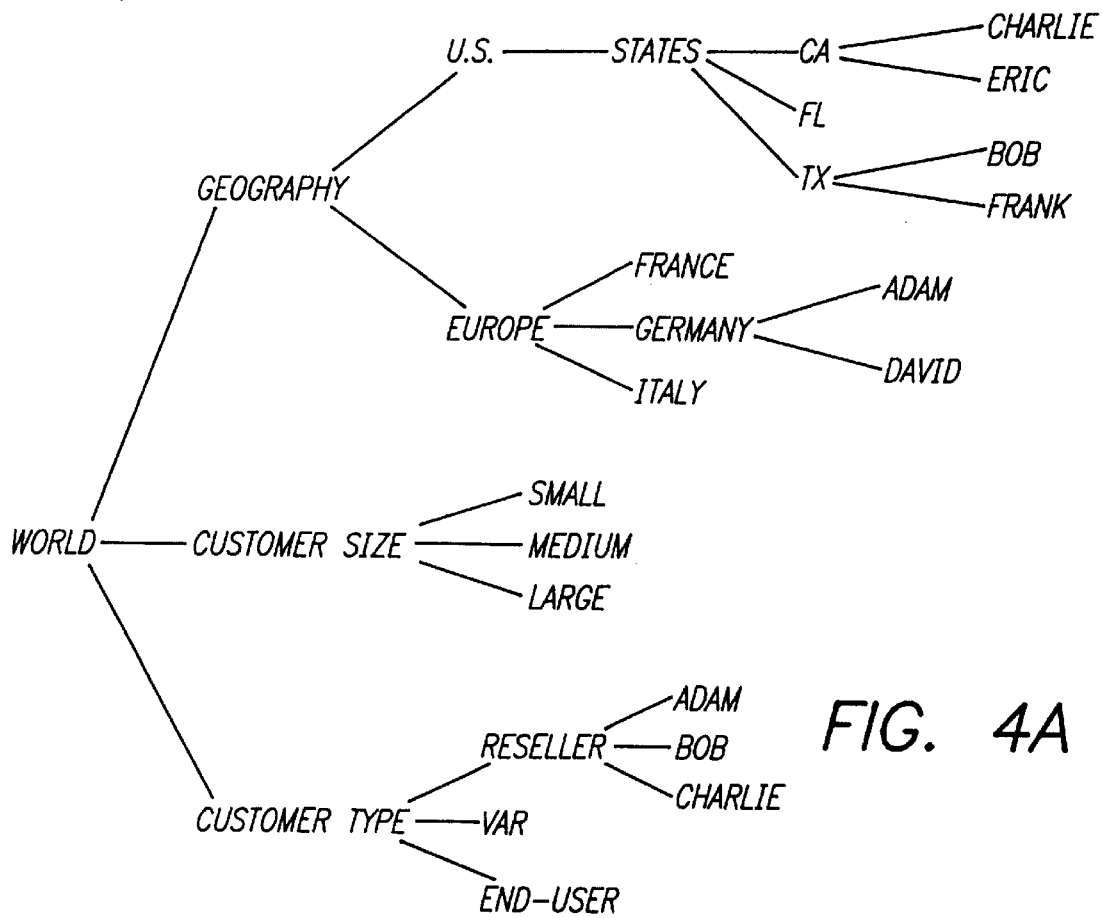
FIG. 4A shows an example of an arrangement of an organizational group according to the present invention.

FIG. 4A is an example of a hierarchy of purchasing organizations (i.e. the WHO's) according to the present invention. The hierarchy of purchasing organizations and organizational groups shown in FIG. 4A is an example of a unique hierarchy that can be specified by a user. As shown in FIG. 4A, a user may group various purchasing organizations into a broad category of "World," and create organizational groups such as "Geography," "Customer Size," and "Customer Type" branching off of the root category "World." The Geography branch can be divided into "U.S." and "Europe," and the U.S. branch can in turn be divided into different "States" such as "CA," "TX," and "FL." As shown in FIG. 4A, the Customer Size branch can be divided into "Small," "Medium," and "Large." The Customer Type branch is divided into "Reseller," "VAR," and "End-User." As stated above, this particular grouping of various purchasing organizations is wholly arbitrary and determined by the user of the invention's pricing system. For example, the branch "Europe" can be replaced by "Germany," or alternatively, the entire "Geography" branch can be deleted. In contrast, the prior art pricing systems do not provide users with the capability of generically specifying organizational groups.

According to the present invention, once the user selects a purchasing organization, the invention identifies the organizational groups to which the purchasing organization belongs. For example, if the user selects Adam or Bob as the purchasing organization, the invention identifies Adam or Bob as a Reseller. Accordingly, the various discounts that are applicable to a Reseller would also become automatically applicable to Adam or Bob. In this way, the invention simplifies the prior art's need for maintaining separate tables for each individual purchasing organization such as Adam or Bob. In other words, since Adam along with a number of others, such as Bob, are categorized as Resellers, the need to store, update, and retrieve separate tables for Adam or Bob is alleviated.

According to the present invention a purchasing organization may belong to a number of organizational groups. For example, as shown in FIG. 4A, Bob belongs to Resellers as well as to purchasing organizations located in Texas. Charlie is a Reseller as well as a purchasing organization located in California. Adam belongs to Resellers as well as to purchasing organizations in Germany. As illustrated below, this feature of the invention has significant advantages over the prior art pricing systems. The prior art pricing systems are "hard-coded" and do not permit categorizing a purchasing organization under multiple organizational groups. Accordingly, the prior art requires storage, retrieval, and maintenance of a number of separate pricing tables for organizations that are similar, but may belong to categories which make them not identical. For example, although Bob and Charlie are both Resellers, the prior art systems have to store separate price tables and price adjustment tables for Bob and Charlie since one is a Reseller in Texas and the other is a Reseller in California.

By way of example, according to the present invention, if Bob is a Reseller located in the state of Texas, selecting Bob as the purchaser would automatically invoke the applicable state tax for Texas. Likewise, if Charlie was a Reseller located in California, selecting Charlie would automatically invoke the applicable state tax for California. Thus, the invention overcomes the need to maintain separate tables for a Reseller who is located in Texas as opposed to one who is located in California.

Yet as another example, since Adam is a Reseller in Germany, when the user selects Adam, the invention automatically identifies Germany as the Geographic location of Adam. Subsequently, the invention recalls price adjustments for all Resellers, price adjustments for any purchasing organization located in Germany, and price adjustments specifically applicable to Resellers located in Germany. In the final determination of adjustments, the invention recognizes that the last price adjustment category (namely, the price adjustment category applicable specifically to Resellers in Germany) is more specific than the other two categories (namely, the category of purchasing organizations in Germany and the category of all Resellers). The invention then recalls the most restrictive category of adjustments (i.e. the adjustments applicable specifically to Resellers in Germany) to Adam.

The invention may determine that one category of price adjustments applicable to Resellers in Germany are currency exchange rate adjustments. Accordingly, the invention recalls a currency conversion table for converting U.S. currency to German currency. In this example, the prior art pricing systems had to store, update and retrieve a separate price adjustment for each purchaser based on the currency exchange rate for that purchaser's particular geographic location. The prior art system requires that a separate price table be updated for Adam alone every time the exchange rate for U.S. versus German currencies changes. Manifestly, this imposes tremendous demand on the computer system and the storage space required by the prior art pricing systems. Since the invention identifies Adam as a Reseller in Germany, the currency conversion requires a single table to keep track of the changes in the currency exchange rate between Germany and the U.S. As stated above, this table is automatically recalled when the user selects Adam as the purchaser.

Figure 4B:
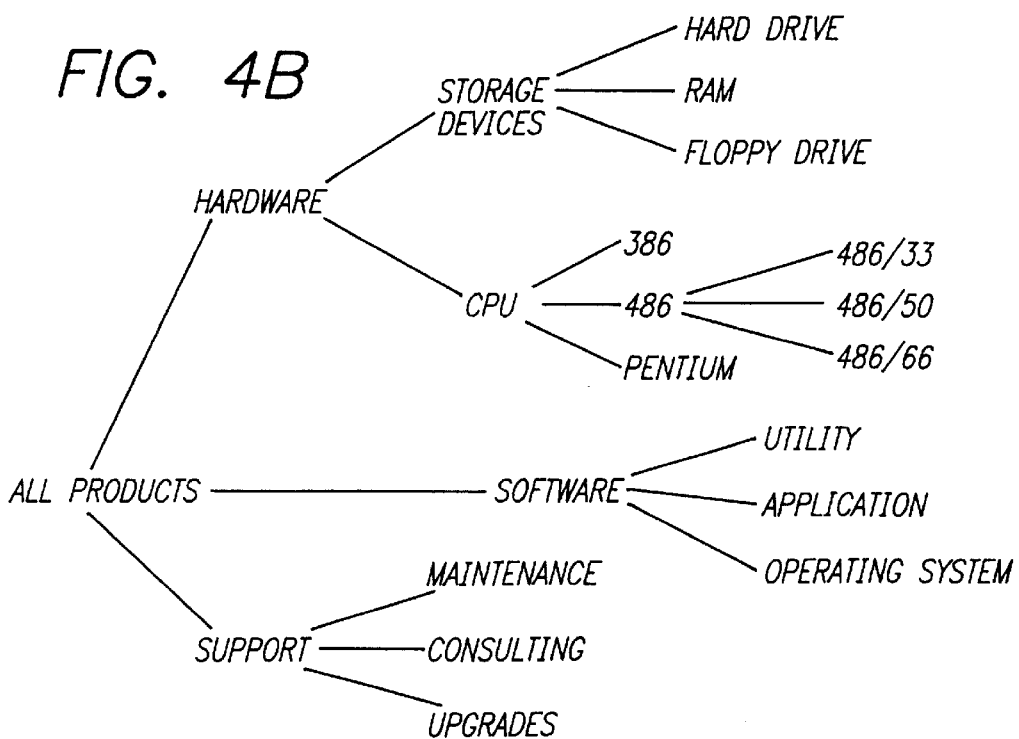
FIG. 4B shows an example of an arrangement of an product group according to the present invention.

FIG. 4B is an example of a hierarchy of products (i.e. the WHAT's) according to the present invention. The hierarchy of products and product groups shown in FIG. 4B is an example of a unique hierarchy that can be specified by a user. As shown in FIG. 4B, a user may group various products into a broad category of "All Products," and create product groups such as "Hardware," "Software," and "Support" branching from the broad category of "All Products." The "Hardware" branch can be divided into "Storage Devices" and "CPU," and the "CPU" branch can in turn be divided into "386," "486 ," and "Pentium." As shown in FIG. 4B, the "Software" branch can be divided into "Utility," "Application," and "Operating System." The "Support" branch is divided into "Maintenance," "Consulting," and "Upgrades." As with organizational groups, the particular grouping of various products is entirely arbitrary and determined by the user of the invention's pricing system. By contrast, the prior art pricing systems do not provide users with the capability of generically specifying product groups.

According to the present invention, once the user selects a product, the invention identifies the product groups to which the product belongs. For example, if the user selects "Pentium" as the product, the invention identifies Pentium as a CPU. Accordingly, the various discounts that are applicable to a CPU and all Hardware products would also become automatically applicable to a Pentium. In this way, the invention simplifies the prior art's need for maintaining separate tables for each individual products such as a Pentium. In other words, since a Pentium, along with a number of other products (such as "486" and "386"), are categorized as a CPU, the need to store, update, and retrieve separate tables for a Pentium CPU (and a 486 CPU and a 386 CPU) is alleviated.

In general, the invention works up the hierarchical arrangement of organizations and products and identifies all of the organizational groups and product groups that are at higher levels than those selected by the user. For example, if the user selects a 486/33 CPU, the invention identifies and invokes the categories of "486," "CPU," and "Hardware" (see FIG. 4B). Accordingly, all of the applicable price adjustments associated with the categories of "486," "CPU," and "Hardware" are retrieved and applied to 486/33. In this manner, the prior art need to maintain separate and unique price adjustment tables for 486/33 alone is overcome. As with the categorization of purchasing organizations under multiple organizational groups discussed above, a particular product may belong to a number of product groups. This feature of the invention has significant advantages over the prior art pricing systems. The prior art pricing systems do not permit categorizing a single product under multiple product groups. Accordingly, the prior art requires storage, retrieval, and maintenance of a number of separate pricing tables for similar products.

Figure 5:
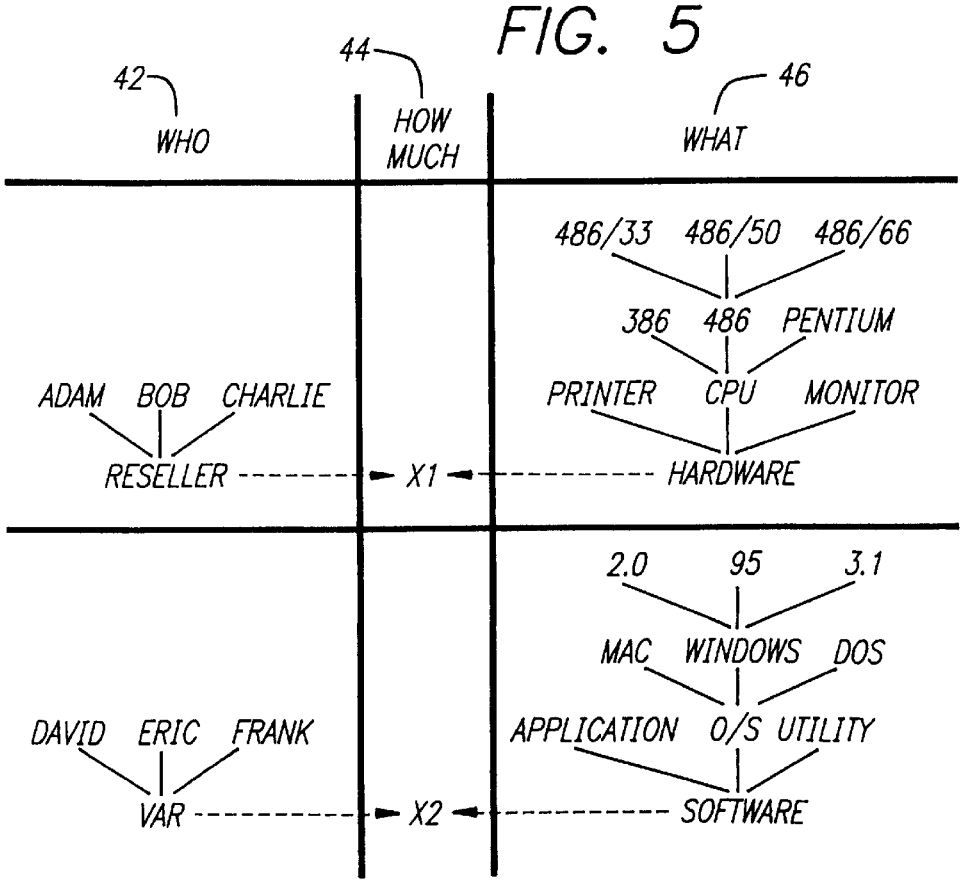
FIG. 5 is an example of the invention's denormalized table for relating various purchasing organizations (or various organizational groups) to various products (or various product groups).

The present invention results in an efficient storage, management and retrieval of pricing data and generation of price recommendations. One aspect of the invention is now explained by referring to FIG. 5 and comparing the invention with the prior art systems for generation of price recommendations. FIG. 5 shows an example of a "denormalized" price table utilized in the present invention. Column 42 contains information as to "who" is the purchaser of the product being sold. In the example shown in FIG. 5, the purchaser may be Adam, Bob, Charlie, David, Eric, or Frank. Column 46 contains information as to "what" product is being purchased. Column 44 is designated a "how much" column and contains "denormalized" numbers. For purposes of the present invention, "denormalized" numbers refers to numbers that do not have a fixed unit and may assume a different meaning and different units depending on the pricing operation that is being performed. In other words, each denormalized number has a unique significance. For example, a denormalized number used in column 44 can refer to the price of a product in dollars. Another denormalized number used in column 44 may be a fraction, such as 1.08, and have no units associated with it. This denormalized number (i.e. 1.08) can refer to a tax rate and be used as a multiplying factor to calculate the final price of a product. As another example, a denormalized number such as 16 can refer to a fixed rebate. This number is used in a subtraction operation. In other words, this number (i.e. 16) is deducted from the price of a product as an adjustment to the price. The specific units of a denormalized number and how it will be applied to adjust the price of a product are determined during "run time" of the invention's system based on information associated with each denormalized number. The invention uses a price adjustment sequence (discussed below) to determine how and when each denormalized number will be applied to adjust the price of a particular product.

Suppose that Adam is interested in purchasing a 486/33 CPU. According to the prior art, this would require retrieving a basic price table such as that shown in FIG. 1. As explained above, a table such as the one shown in FIG. 1 would be one of many basic price tables stored in the prior art database. The reason is that there is a huge number of possible purchasers and possible products, and in a worst case scenario each purchaser may be offered a different price on a particular product. Thus, the retrieved basic price table of FIG. 1 would be one which contains price information for Adam as the prospective purchaser and a 486/33 CPU as the particular product being sold.

The basic price table shown in FIG. 1 does not take into account whether the prospective purchaser (for example, Adam) is in a category common with other purchasers. Nor does it take into account whether the particular product (for example, a 486/33 CPU) is in a category common with other products. Accordingly, a large number of different tables are needed to accommodate all possible combinations of purchasers and products. To make matters worse, the prior art pricing systems need various tables to apply various adjustments to the basic price of a particular product for a prospective purchaser. These adjustments can be, for example, applicable state and local taxes, actual shipping charges, currency conversions, and various discounts. Moreover, each category of adjustments in the prior art has its own sub-adjustment tables. For each product and for a given customer, there are usually different types of discounts. For example, there can be a volume discount, a general purchase agreement discount, a discount effective for certain dates of purchase, an initial offer discount, and so forth. The prior art table in FIG. 2 is an example of a volume discount adjustment that may apply to the price of a 486/33 CPU offered to Adam. Thus, in case Adam is purchasing 486/33 CPU's in volume, the table in FIG. 2 would result in a price reduction of 10% from the basic price of $40 obtained from the basic price table of FIG. 1.

According to the present invention, the organizational category of the purchaser and the product category of the product are determined prior to determining the basic price and applicable adjustments to the basic price. For example, as shown in FIG. 5, the invention first determines that the purchaser (Adam) is a Reseller. It is seen that Bob and Charlie are also Resellers. FIG. 5 also shows that David, Eric, and Frank are purchasers that are "Value Added Resellers" ("VAR"). Other purchasers (not shown in FIG. 5) would also belong to a specific category. The invention then determines that a 486/33 CPU belongs to the category of 486 CPU's, and that 486 CPU's belong to the category of CPU's, and that CPU's belong to the category of Hardware. Thus, the organization (in the example, Adam) and the product (in the example, a 486/33 CPU) are categorized as a Reseller and Hardware respectively. The present invention then recognizes that all Resellers get a certain price adjustment, for example a general discount of 10%, when purchasing Hardware. The general discount of 10% applies to all categories of Hardware purchased by Resellers. The invention also recognizes that a 486/33 CPU is offered to all resellers at a certain basic price, for example $40. The selling price of a 486/33 CPU to Adam is then determined by applying a price reduction of 10% to the basic price of $40. Thus, a 486/33 CPU is offered to Adam for $36.

The invention can also account for any combination of purchasing organizations, organizational groups, products, or product groups and arrive at a final offering price in an efficient manner. For example, all CPU's may be offered to all Resellers at a general discount of 5%. This means that the same discount would be applicable to Adam (a Reseller) when purchasing a 486/33 CPU. This 5% general discount may or may not be in addition to the general discount of 10% (discussed above) applicable to Resellers for purchasing Hardware. As another example, another general discount can apply to all Resellers purchasing 486 CPU's, and yet a specific discount can apply to all Hardware purchased by a particular Reseller such as Adam. The invention would also apply this general and specific discounts to Adam when purchasing a 486/33 CPU. Thus, the invention can account for and apply a combination of various discounts to a purchase of a 486/33 CPU by Adam. In other words, the invention applies general discounts applicable to Resellers when purchasing various sub-categories of Hardware, as well as a specific discount applicable uniquely to Adam when purchasing Hardware. Thus, the invention can combine any number of general or specific discounts to determine the offering price of a particular product offered to a particular purchasing organization.

The invention can apply a number of complicated price adjustments. For example, the invention can apply price adjustments to subcategories to which the organization or the product belongs. For example, a price adjustment (in addition to the 5% discount discussed above) may be applicable to all 486 CPU's purchased by Resellers. Since a 486/33 CPU belongs to the subcategory of a 486 CPU, the additional price adjustment would apply to a 486/33 CPU purchased by a Reseller. Likewise, price adjustments applicable to CPU's in general would also be applicable to a 486/33 CPU as shown in FIG. 5. The same reasoning applies to subcategories in the organizational groups. For example, if a Reseller (such as Adam) has three branches in three different cities (not shown in FIG. 5), the price adjustment applicable to Adam would also apply to each of its three branches. Thus, as with various product groups, additional price adjustments can apply in various levels in the organizational groups. Therefore, grouping of products and organizations into various categories eliminates the need to maintain a huge number of basic price and adjustment tables to account for every possible combination of purchasing organizations and products.

Still referring to FIG. 5, column 44 is labeled as a "how much" column. The numbers in this column are used to arrive at a price adjustment. The numbers in this column are "denormalized," meaning that each number in this column has a unique significance. In other words, a number in this column could refer to a basic price, or an adjustment to the basic price such as a tax rate, a shipping charge, a currency conversion rate, or various discounts applicable to the basic price. Use of denormalized tables results in further advantages in the present invention as described below.

The invention's denormalized price table overcomes a prior art disadvantage since the invention is not limited in speed or in storage space by the prior art's requirement of retrieving several tables from the database (it is noted that although the invention is discussed in terms of a "database," the invention can be implemented using any data source that may be different from a conventional database). The entries in the denormalized column (i.e. column 44) of the present invention can signify numeric values of a variety of different parameters. These parameters can be the basic price of a product or various adjustments and sub-adjustments applicable to the basic price. As stated above, these parameters would have required their own separate tables in the prior art. For example, X1 in column 44 can refer to a discount applicable to a general discount of 10% applicable to all categories of hardware purchased by Resellers. Alternatively, X1 could denote a shipping charge of $15 applicable to shipment of all hardware to resellers. Yet as another example, X1 could designate a state tax of 8% applicable to all Hardware sold to Resellers. In each of these cases, the meaning of X1 and the interpretation of the value assigned to X1 is different. In the case of a general discount of 10%, X1 has a value of 0.10 and is used in an equation involving the basic price of a product in order to reduce the basic price by 10%. In the case of a shipping charge of $15, the final price of a product (after other adjustments such as discounts and taxes) is increased by 15.00. In the case of a state tax of 8%, X1 has a value of 0.08 and is used in an equation involving the price of a product after certain adjustments (such as a general discount). According to the present invention, the particular treatment of the value of X1 is determined during run time. In other words, the numbers in the prior art tables are "abstracted" and stored as a denormalized number in the "how much" column (i.e. column 44 in FIG. 5), and the interpretation of the numbers are left up to the interpretation engine of the present invention. This dynamic interpretation of abstracted numbers during run time along with the invention's feature permitting a user to flexibly specify and change product and organizational groups is in contrast to the static nature of the prior art pricing systems. The prior art pricing systems utilize fixed and predetermined pricing and price adjustment tables that are "hard-coded" and cannot be changed to match a particular user's pricing preferences or the user's method of doing business. The invention also permits a user to define the sequence in which various price adjustments are applied. For example, the user can define a sequence in which a tax adjustment is the last adjustment, and a currency conversion is the first adjustment.

In contrast, the prior art systems do not use denormalized price tables. For example, a pricing application called R3 made by SAP, does not utilize denormalized price tables. As a result, R3 has the prior art disadvantages in requiring a number of price adjustment tables and a number of database queries to retrieve applicable price adjustments. Likewise, an order entry application made by Oracle has a similar shortcoming in that it does not use denormalized price tables and as such the Oracle application requires a number of database queries to retrieve various price adjustments from a large number of price adjustment tables.

Thus, FIG. 5 illustrates that the invention greatly simplifies the prior art tables in at least two ways. First, products and organizations are categorized in different product and organizational groups. Second, the various product and organizational groups are associated with denormalized numbers whose interpretation is determined during run time. Each of these two simplifications introduced by the present invention results in a great reduction in the number of tables stored in different locations of the prior art mainframe database. One way to view these two simplifications is that each of these two simplifications result in a reduction of the number of queries to the database. In other words, the prior art made a number of queries for obtaining the data in the basic price table and various adjustment and subadjustment tables in the prior art. As explained above, the invention makes fewer queries because the invention has eliminated the need for the very large number of prior art tables. A reduction in the number of queries to the database also results in a speed advantage in the present invention. Each query to a typical pricing database takes about one to two seconds for completion. Thus, the reduction in the number of queries results in the speed advantage in the present invention.

The prior art price generation systems have a predefined organizational hierarchy that is fixed and cannot be changed by a user. In contrast, the present invention provides great flexibility for a user to specify a unique organizational hierarchy. The "who" column (column 42) in FIG. 5 shows an example of two different organizations, i.e. a Reseller and a Value Added Reseller ("VAR"). These organizations are typically part of a family or tree of organizations. Just as a 486/33 CPU belongs to the families of 486 CPU's, CPU's, and hardware respectively, a Reseller or a VAR is typically part of a family or hierarchy of organizations. The invention permits the user to specify, with total flexibility, a unique hierarchy (or family tree) for various organizations that are purchasers of the user's products or services.

Another advantage of the present invention is that the invention greatly simplifies creation and maintenance of the invention's pricing data. For example, in the prior art, creation of pricing data for a new product requires addition of new price tables such as that shown in FIG. 1. Moreover, for each added new price table, the prior art requires a number of adjustment tables such as the volume discount table shown in FIG. 2. Accordingly, the addition of a new product requires a large amount of data to be added to the prior art pricing systems. By contrast, the present invention permits a user to add price adjustments to an entire category of products, thus overcoming the prior art need to add a number of price adjustment tables for each product. For example, a modification in the price adjustments applicable to the Hardware product group in FIG. 4B is sufficient to modify price adjustments applied to all 486 CPU's. Accordingly, the need to create price adjustment tables separately applicable to 486 CPU's is overcome. Specifically, the need to create price adjustment tables separately applicable to 486/33 CPU, 486/50 CPU, and 486/66 CPU is overcome. Thus, according to the present invention, the common price adjustments in a product group that is above a new product eliminate the prior art need for the large number of separate price adjustment tables needed for accomadating the addition of a new product.

Moreover, in the prior art, creation of pricing data for a new purchaser also requires addition of new price tables such as that shown in FIG. 1. Further, for each added new price table, the prior art requires a number of adjustment tables. Accordingly, the addition of a new purchaser requires a large amount of additional data in the prior art pricing systems. By contrast, the present invention permits a user to add price adjustments to an entire category of organizational groups, thus overcoming the prior art need to add a number of price adjustment tables for each new purchaser. For example, a modification in the price adjustments applicable to the Reseller organizational group in FIG. 4A is sufficient to modify price adjustments applied to Adam, Bob, and Charlie. Accordingly, the need to create price adjustment tables separately applicable to each Reseller is overcome. Specifically, the need to create price adjustment tables separately applicable to Adam, Bob, and Charlie is overcome. Thus, according to the present invention, the common price adjustments in an organizational group that is above a new purchaser eliminate the prior art need for the large number of separate price adjustment tables needed for accomadating the addition of a new purchaser.

For the same reasons that creation of new pricing data for a new product or purchaser is greatly simplified in the present invention, the maintenance of existing pricing data is also greatly simplified. For example, when price adjustments applicable to an entire product group are changed, the price adjustments applicable to individual products within the product group are automatically changed. This overcomes the prior art need to separately change price adjustment tables corresponding to each product. Likewise, when price adjustments applicable to an entire organizational group are changed, the price adjustments applicable to individual purchasers within the organizational group are automatically changed. This overcomes the prior art need to separately update price adjustment tables corresponding to each purchaser. This total flexibility in creating and maintaining pricing data of the present invention is a significant advance over the prior art's rigid and difficult procedures to creating and maintaining pricing tables. Moreover, the invention's flexibility in creating and maintaining pricing data also results in a smaller amount of pricing data than that required by the prior art.

Figure 6:
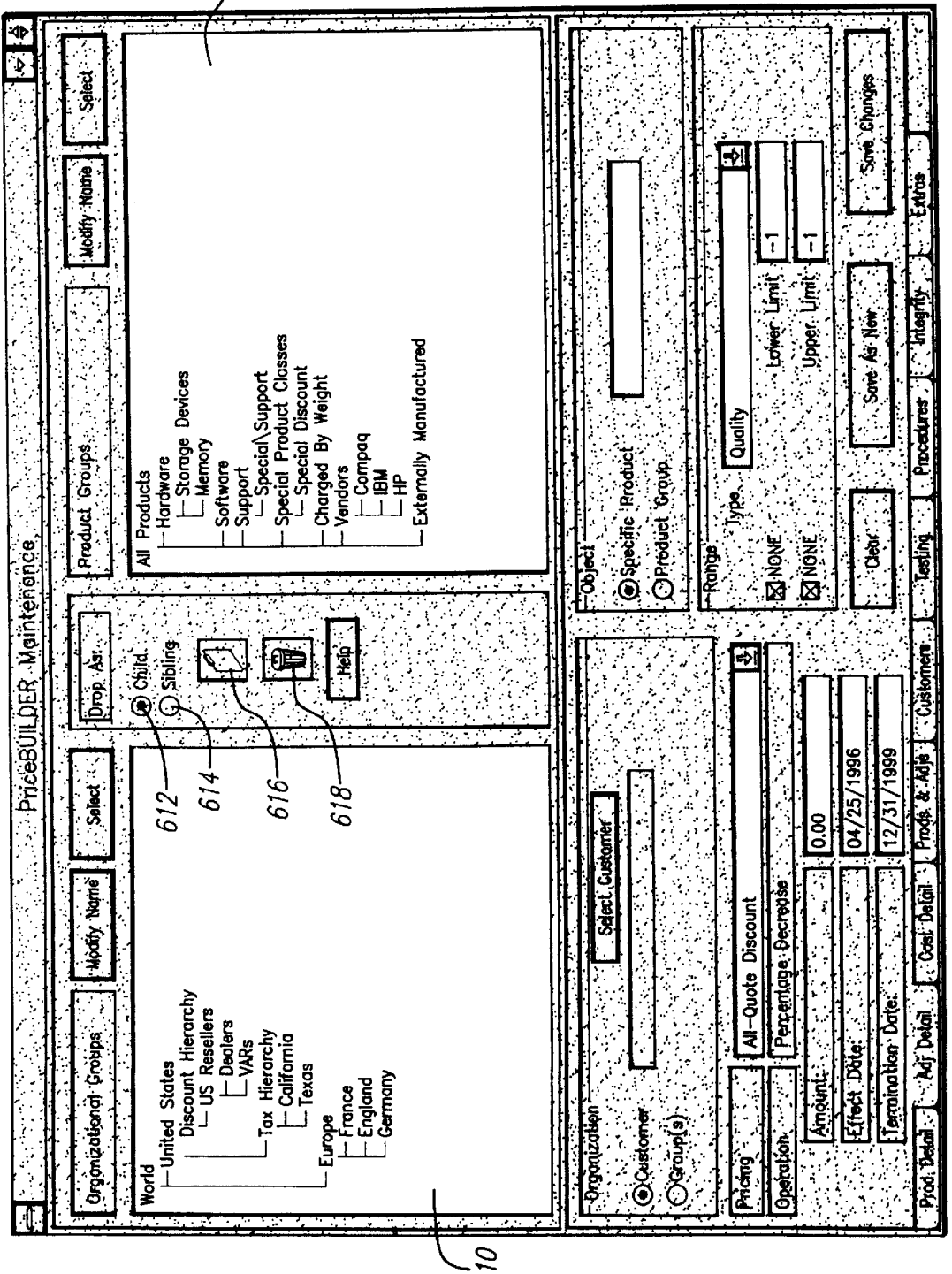
FIG. 6 shows a computer screen according to the present invention illustrating user arranged organizational and product groups.

An example of an organizational and a product group is shown in FIG. 6. Window 610 shows an example of organizational groups as shown on a computer screen according to the present invention. A user can arbitrarily select the different grouping of the organizations. For example, in FIG. 6, the user has selected to divide the "World" into two broad categories of "United States" and "Europe." The category "United States" is in turn divided into "Discount Hierarchy" and "Tax Hierarchy." The "Discount Hierarchy" is itself divided into "US Resellers" which comprises "Dealers" and "VARs." The "Tax Hierarchy" is divided into "California" and "Texas." The broad category of "Europe" is itself divided into "France," "England," and "Germany." As stated above, each of the organizational groups are determined solely by the user. To add a particular organizational group, the user first highlights the target group. For example, the user may highlight "England" as the target group. Then the user selects the folder icon 616, indicating that a new group is to be added. The user then determines whether the organizational group is to be added as a subcategory of "England" or in the same category as "England." In the first case, the user selects "Child" 612. This causes a branch to be created under the category of "England." For example, the user can create branches such as "Southern England," "Central England," and "Northern England." In the second case, the user selects "Sibling" 614. This causes a branch to be created under "Europe" at the same level that the group "England" exists. For example, the user can create branches such as "Italy" and "Spain." Thus, "France," "England," "Italy," "Spain," and "Germany" would all be at the same level and they would all be one level below "Europe." Finally, any organizational group may be deleted simply by "dragging" and dropping the group in the trash can icon 618.

The explanations given above with respect to the user selection of how to group the various purchasing organizations also apply to the user selecting various product groups. Window 620 shows an example of the grouping of "All Products" according to a particular user's way of doing business. As shown in window 620 of FIG. 6, "All Products" are divided into broad categories of "Hardware," "Software," "Support," "Special Product Classes," "Charged by Weight," "Vendors," and "Externally Manufactured." Each of these broad categories is in turn divided into subcategories as shown in window 620. As stated above, each of the product groups are determined solely by the user. To add a particular product group, the user first highlights the target group. For example, the user may highlight "Vendors" as the target group. Then the user adds a desired product group as desired in the manner described above with respect to the organizational groups. Any product group may be deleted simply by "dragging" and dropping the group in the trash can icon 618.

Figure 7:
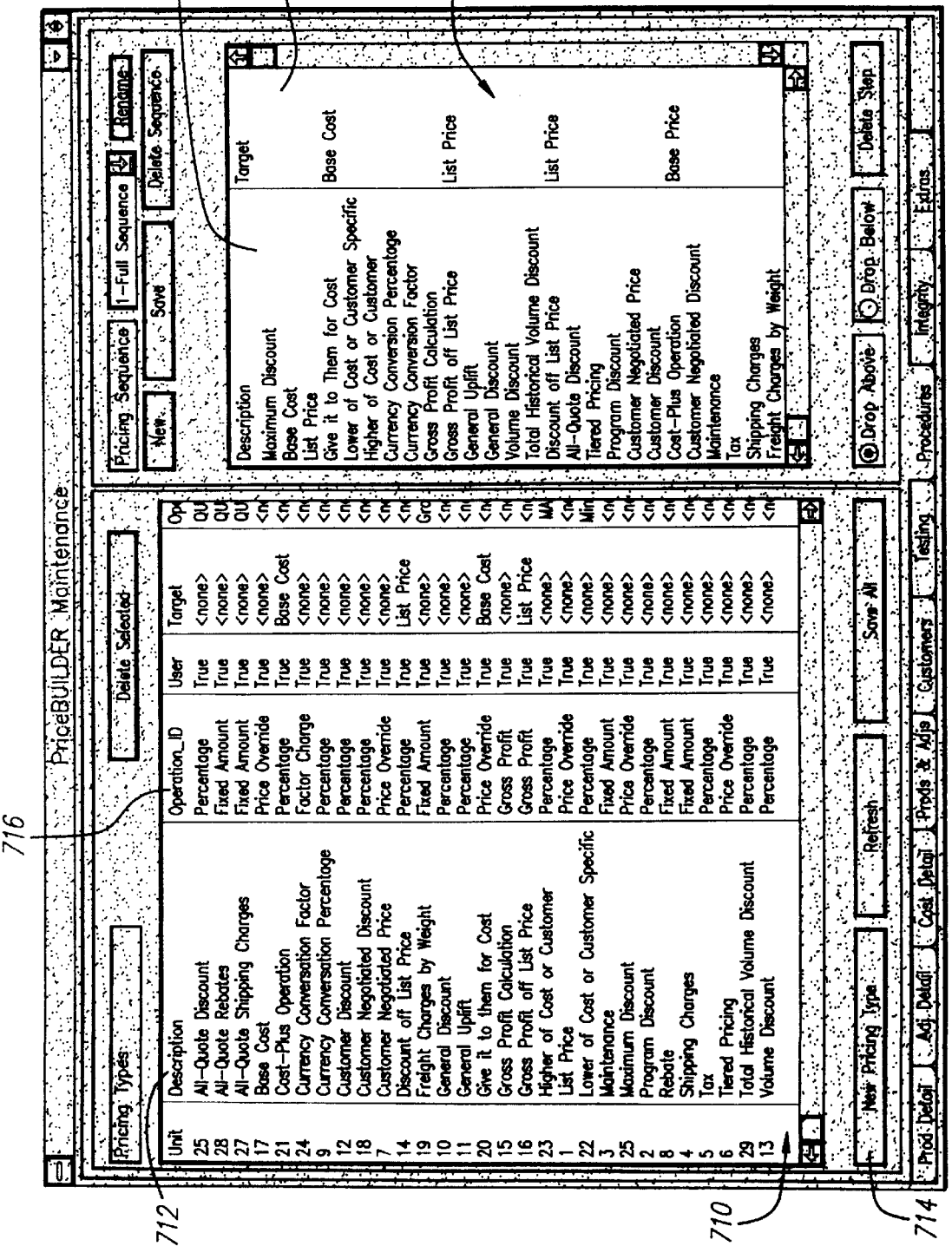
FIG. 7 is an example of a computer screen according to the present inventions showing the various user specified pricing types and user specified pricing sequence.

FIG. 7 illustrates how the numbers in the "How Much" column 44 of FIG. 5 are determined. Window 710 in FIG. 7 shows the various "pricing types," and window 720 shows a sample "pricing sequence." Examples of pricing types specified by a user are shown in column 712. Some of the pricing types shown in column 712 are Base Cost, Currency Conversion Factor, Customer Discount, Customer Negotiated Discount, Customer Negotiated Price, Discount off List Price, General Uplift, List Price, Rebate, Shipping Charges, Tax, and Volume Discount A user may simply click on "New Pricing Type" icon 714 to specify any desired pricing type. For example, the user may specify a pricing type called, the "President's Discount" applicable to certain designated customers.

Column 716 is called the "Operation" column. Operation column 716 specifies the type of mathematical operation that is performed for each pricing type. For example, Operation column 716 specifies that a Base Cost is an override operation. In other words, a Base Cost overrides all prior pricing calculations. Thus, if various price adjustments yield a price that is lower than the Base Cost, the Base Cost operation would replace that price with a price equal to the basic cost of the product. Operation column 716 specifies that a List Price is also an override operation. However, a Currency Conversion Factor is specified to be a Factor Change operation according to Operation column 716. For example, a factor of 1.33 may be multiplied by the price of a product in U.S. currency to yield the price of the product in another country's currency. The Currency Conversion Percentage pricing type in column 712 is specified to be a Percentage operation in column 716. For example, the percentage can be 133%. In other words, the price of a product in U.S. currency is multiplied by 133% to yield the price of the product in a particular foreign currency.

As another example, a Customer Negotiated Discount pricing type (shown in column 712) is a Percentage operation as specified in column 716. For example, the percentage can be 75%. In other words, the price of a product is multiplied by 75% to yield the price of the product after the Customer Negotiated Discount. As yet another example, a Tax pricing type (shown in column 712) is also a Percentage operation as shown in column 716.

The prior art does not allow a user to specify or modify any pricing types. The invention's feature in permitting a user to specify various pricing types allows the user to flexibly set a pricing scheme applicable to various products and purchasing organizations. The prior art systems have a fixed number, and fixed types, of pricing types. Thus, according to the prior art, the user had to modify his or her pricing system and business methods in order to accommodate the prior art pricing systems. The invention adjusts, in a completely flexible manner, to the user's specific pricing methodology. Not only does the invention permit a user to uniquely specify his or her own various pricing types, but the invention also allows a user to specify the sequence in which the various pricing types are applied in arriving at the final price of the product. This is described in more detail below.

After a user specifies the various Pricing Types in column 712, the invention permits the user to also specify the sequence in which the different Pricing Types are applied in order to arrive at the final offering price of a particular product. Column 718 shows a sample sequence used to apply the various Pricing Types. In the sample sequence shown in column 718, the Maximum Discount is the first applicable operation. For example, the Maximum Discount can be 50%. In the sample sequence shown in column 718, the Maximum Discount is followed by the Base Cost. Since Base Cost is an override operation, the Maximum Discount is automatically overridden by the Base Cost. Thus, if the Base Cost is $80.00, the number 80.00 overrides the number 0.5 (i.e. 50%). Nevertheless, the number corresponding to the Maximum Discount (i.e. 0.5) is stored for informational purposes. For example, the Maximum Discount may be used to override a total discount that exceeds the Maximum Discount. Alternatively, the Maximum Discount may be used as a flag to prevent sale of a product at a discount that exceeds the Maximum Discount. The numerical value assigned to the Maximum Discount pricing type (in this example, 0.5) can be thought of as a denormalized number discussed in relation with FIG. 5. In other words, the significance of this number (in this example, 0.5) is determined during run time. The numerical value assigned to a Maximum Discount pricing type is not used in an addition, subtraction, or multiplication operation. However, the numerical value of the Maximum Discount is used in a comparison operation to ensure that the net result of all discounts applied to a particular product does not exceed a certain limit (i.e. the limit set by the Maximum Discount pricing type).

As shown in the sample sequence of column 718, a Tax operation is applied after many operations are applied to arrive at the final offering price. As shown in columns 712 and 716, a Tax Pricing Type is a percentage Operation. As shown in column 718, a percentage increase due to a Tax operation will be applied near the end of the pricing sequence. In other words, taxes are applied after almost all other operations. In the sample sequence shown in column 718, the only two operations that are applied after the Tax operation are the Shipping Charges and the Freight Charges by Weight operation. The reason is that shipping charges and freight charges are not taxed. Thus, the final offering price of the product is determined by applying tax charges just prior to applying shipping and freight charges.

As another example, FIG. 8 shows an alternative sequence (shown in column 818) in which the various Pricing Types in column 712 may get applied. As shown in column 818 the alternative sequence is a simpler sequence and involves the List Price, Currency Conversion Percentage, Currency Conversion Factor, Customer Negotiated Discount, and Customer Negotiated Price. According to this sequence, the List Price override operation is the first step in designating an offering price for the product. Then currency conversion operations are performed, and finally negotiated discount and negotiated price operations are performed.

The invention permits a user to arrange a customized sequence to apply to the Pricing Types (also specified by the user) in order to arrive at the final offering price. For example, a sequence can include only the Base Cost, List Price, and Tax. Thus, the price of the product is determined first by the Base Cost override operation, then by the List Price override operation, and then by applying taxes. Although the List Price override operation overrides all prior price determinations for a given product, the Base Cost is still useful for informational purposes. Also, if the List Price is removed from the sequence, the Base Cost still remains as an operation which begins the sequence based on the basic cost of a given product. Manifestly, any other pricing sequence can be designated by the user and applied to the user selected Pricing Types.

The invention provides a further feature in determining the final price of a product by providing a "Target" operation shown in column 722 of FIG. 7. By way of an illustrative example, suppose that a product's initial sales price is equal to its base cost of $100, and that according to the user specified pricing sequence two 10% discounts must be applied to arrive at the final offering price. Ordinarily, the first 10% discount results in a price of $90 (i.e. $100−$10=$90) and the second 10% discount results in a price of $81 (i.e. $90−$9=$81). The invention permits the target price to remain the initial sales price, i.e. the base cost of $100 in the example. Thus, if the user specifies that the target price is the Base Cost, both of the 10% discounts are applied to the base cost of $100. In other words, the first discount results in a price of $90 (i.e. $100−$10=$90) and the second 10% discount results in a price of $80 (i.e. $90−$10=$80). The provision of the Target operation permits the user to have further flexibility in determining the final offering price of a product. For example, even if the final offering price of a product reflects a deep discount to a certain purchasing organization, the user (here, the selling organization) can specify that maintenance fees should be calculated off of the list price or the base cost, instead of the deeply discounted offering price. The user can also specify the target price to be the minimum or maximum value of another pricing type. In the above example, the maintenance fees can be calculated based on the minimum or maximum value of a particular pricing type, such as the "Cost of Customer Specific Pricing."

Figure 9:
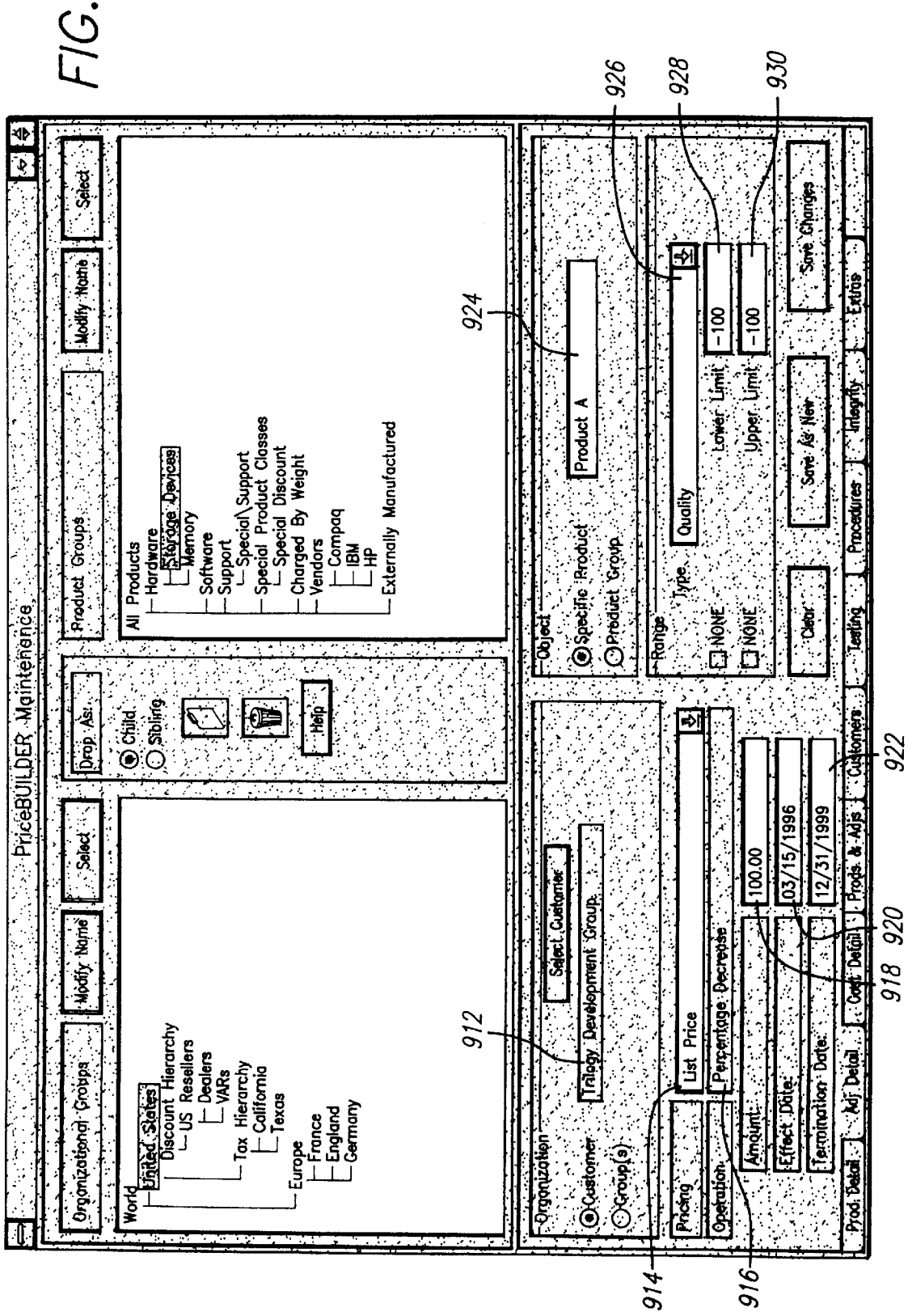
FIG. 9 is an example of a computer screen according to the present invention showing pricing adjustment details for a specific purchasing organization and a specific product.

As discussed above in relation to FIG. 5, the invention simplifies the prior art tables by associating a value in "How Much" column 44 with an entire purchasing category in "Who" column 42 and an entire product category in "What" column 46. FIG. 9 is an example of a computer screen according to the invention which corresponds to the table of FIG. 5. As shown in FIG. 9, the user selects a specific customer (for example, Trilogy Development Group) in box 912. Then the user selects a Pricing Type, such as a List Price as shown in box 914. The invention automatically displays the operation associated with the Pricing Type in box 916. In the present example, the operation (associated with a List Price) is a Price Override which is shown in box 916. In box 924 the user selects Product A as the specific product offered. for sale to the customer (here Trilogy Development Group). In box 918 the user specifies that the List Price for Product A offered to Trilogy Development Group is $100. In box 920 the user indicates that the effective date for this List Price is Mar. 15, 1996. In box 922 the user indicates that the termination date for the List Price is Dec. 31, 1999. In box 926 the user specifies the required quantity of Product A offered to Trilogy Development Group at the List Price of $100. In the present example, the user has set the quantity to be between 100 and 1000 units (boxes 928 and 930). In other words, the List Price for quantities below 100 and above 1000 units would be different than $100.

Figure 10:
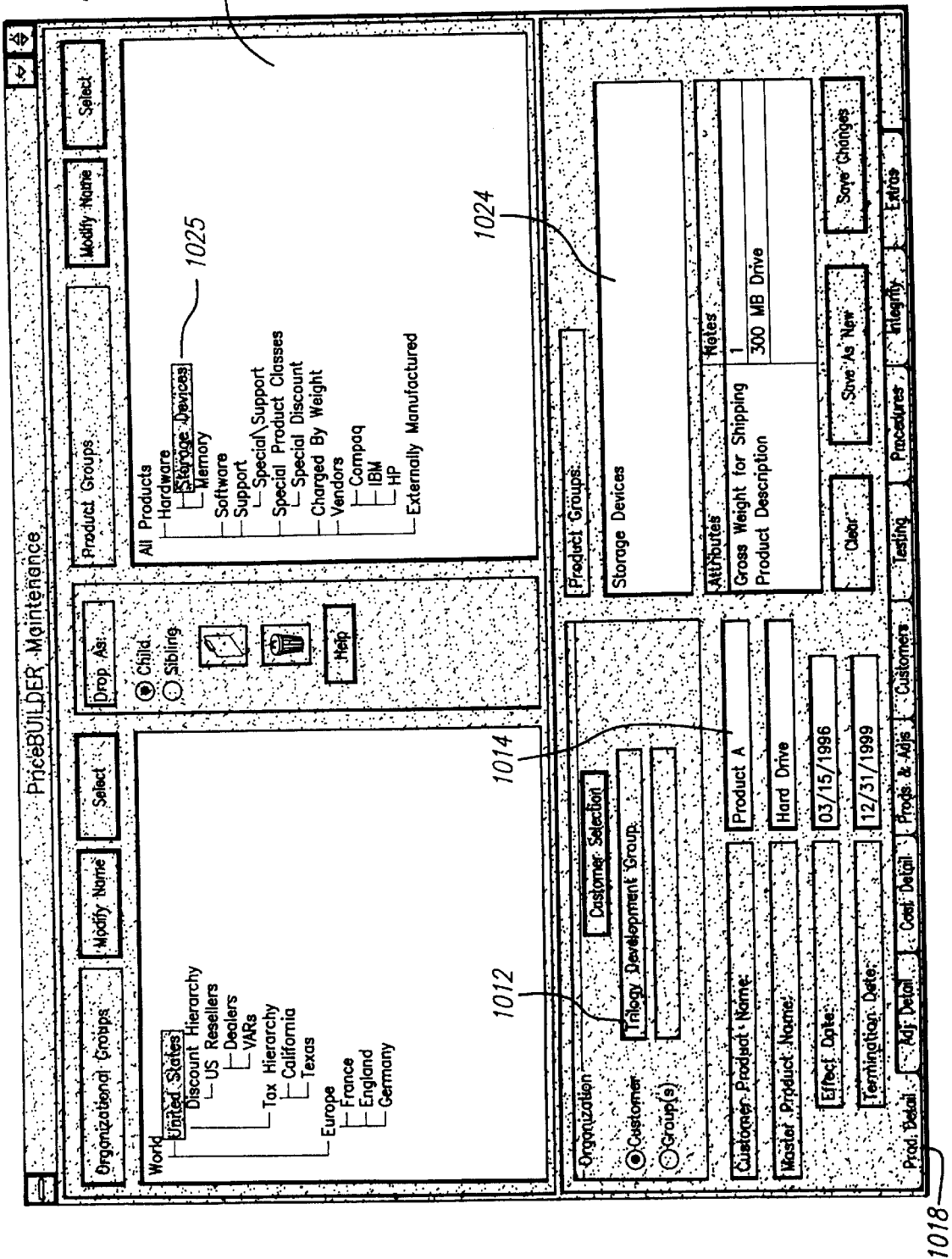
FIG. 10 is an example of a computer screen according to the present invention showing product details for a specific purchasing organization and a specific product.

As discussed above, the invention permits the user to specify the organizational groups to which the specified customer (here the Trilogy Development Group) belongs. The invention also permits the user to specify the product groups to which the specified product (here Product A) belongs. FIG. 10 shows the "Product Details" corresponding to Product A (folder tab 1018 indicates that this is a Product Details screen). Box 1014 shows that the product specified by the user is Product A. The user specifies that the product group to which Product A belongs is Storage Devices group. This is accomplished by selecting Storage Devices group 1025 from the Product Groups window 1030, and then "dragging" the Storage Devices product group and "dropping" it in box 1024. Box 1024 is used to display the product group which the user has identified as the group containing a particular product. In this example, Product A is shown to belong to the Storage Devices product group.

Figure 11:
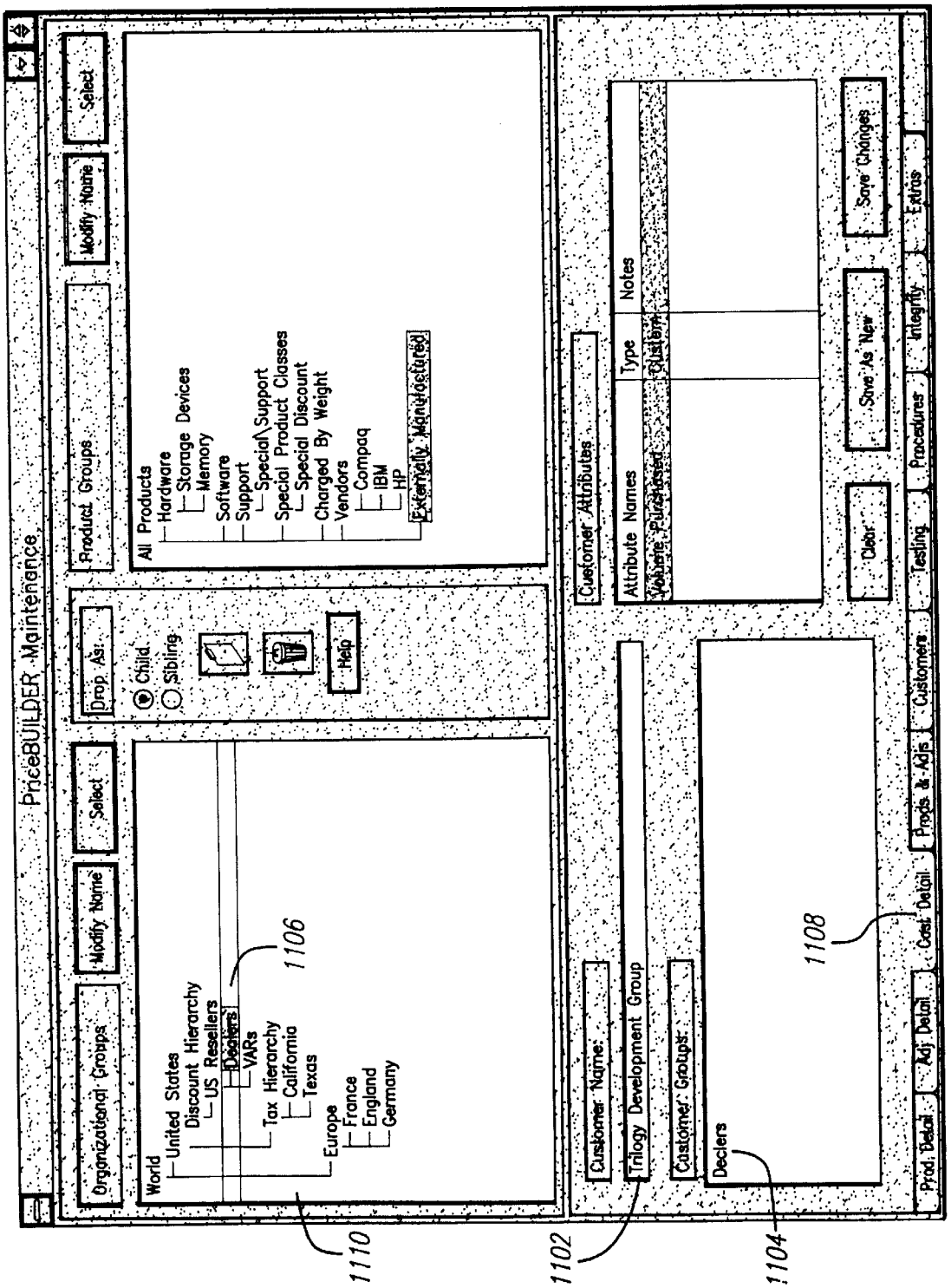
FIG. 11 is an example of a computer screen according to the present invention showing customer details for a specific purchasing organization and a specific product.

FIG. 11 is an example of how a user can specify the organizational group for a specified customer. Folder tab 1108 ("Customer Detail") indicates that this computer screen permits the user to specify customer details. Box 1102 shows the specified customer to be Trilogy Development Group. The user then specifies the organizational group to which the customer belongs. This is accomplished by "dragging" the desired organizational group from the organizational groups window 1110 and "dropping" the group in box 1104. In the present example, the user has specified that "Dealers" is the organizational group to which the specified customer belongs. As such, boxes 1102 and 1104 show that Trilogy Development Group is a Dealer.

Figure 12:
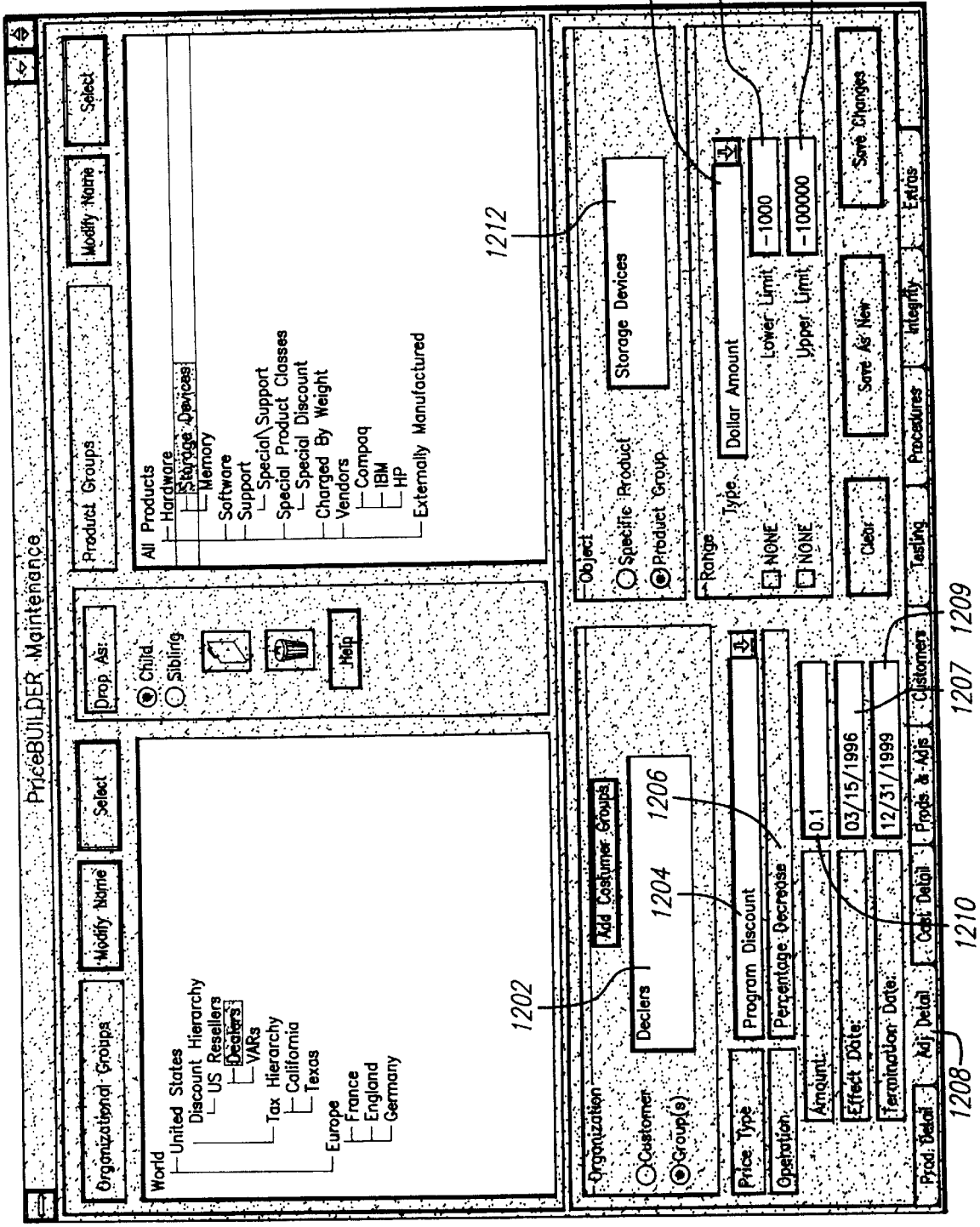
FIG. 12 is an example of a computer screen according to the present invention showing pricing adjustment details for an organizational group and a product group.

FIG. 12 shows some of the price adjustment parameters specified for the "Dealers" organizational group and the "Storage Devices" product group. Folder tab 1208 ("Adjustment Detail") indicates that the computer screen shown in FIG. 12 permits a user to specify various price adjustments. As discussed in relation to FIG. 5, the price adjustment parameters relate an entire category of products (shown in the "What" column of FIG. 5) to an entire category of organizational groups (shown in the "Who" column of FIG. 5). FIG. 5 also showed the various price adjustments in the "How Much" column. In the example shown in FIG. 12, the organizational category of Dealers is the "Who" in FIG. 5 and the product category of Storage Devices is the "What" in FIG. 5. The organizational group category of Dealers is shown in box 1202 and the product category of Storage Devices is shown in box 1212. In the example shown in FIG. 12, the price adjustment (i.e. the "How Much" in FIG. 5) is a Program Discount for all organizations belonging to Dealers purchasing any product belonging to Storage Devices. The Program Discount is a Pricing Type and is shown in box 1204. As shown in box 1206, the Program Discount is a percentage decrease Pricing Type. Moreover, in boxes 1207 and 1209 the effective date and the termination date for the Program Discount are specified as Mar. 15, 1996 and Dec. 31, 1999, respectively. Also, boxes 1214, 1216, and 1218 show that the dollar amount for the Program Discount must be in the range of $1,000 to $100,000. The amount of the percentage decrease is shown in box 1210 as 0.1. In other words, any product belonging to the Storage Device group is sold to a customer belonging to the Dealers group at a 10% discount, on the condition that the product is purchased between Mar. 15, 1996 and Dec. 31, 1999, and that the customer buys between $1,000 and $100,000 worth of the product.

Thus, although the List Price for Product A sold to Trilogy Development Group was specified to be $100, the Program Discount of 10% automatically applies to the purchase of Product A by Trilogy Development Group. The reason is that the invention recognizes that Trilogy is a dealer and that all dealers get a 10% discount when purchasing a storage device and that Product A is a storage device. The 10% discount applies if the purchase is made between Mar. 15, 1996 and Dec. 31, 1999, and if the amount purchased is between $100 and $100,000 worth of Product A. As discussed above, the feature of the present invention that relates an entire category of products with an entire category of organizational groups presents a significant advantage over the prior art due to simplification of the prior art's price tables and price adjustment tables.

Figure 13:
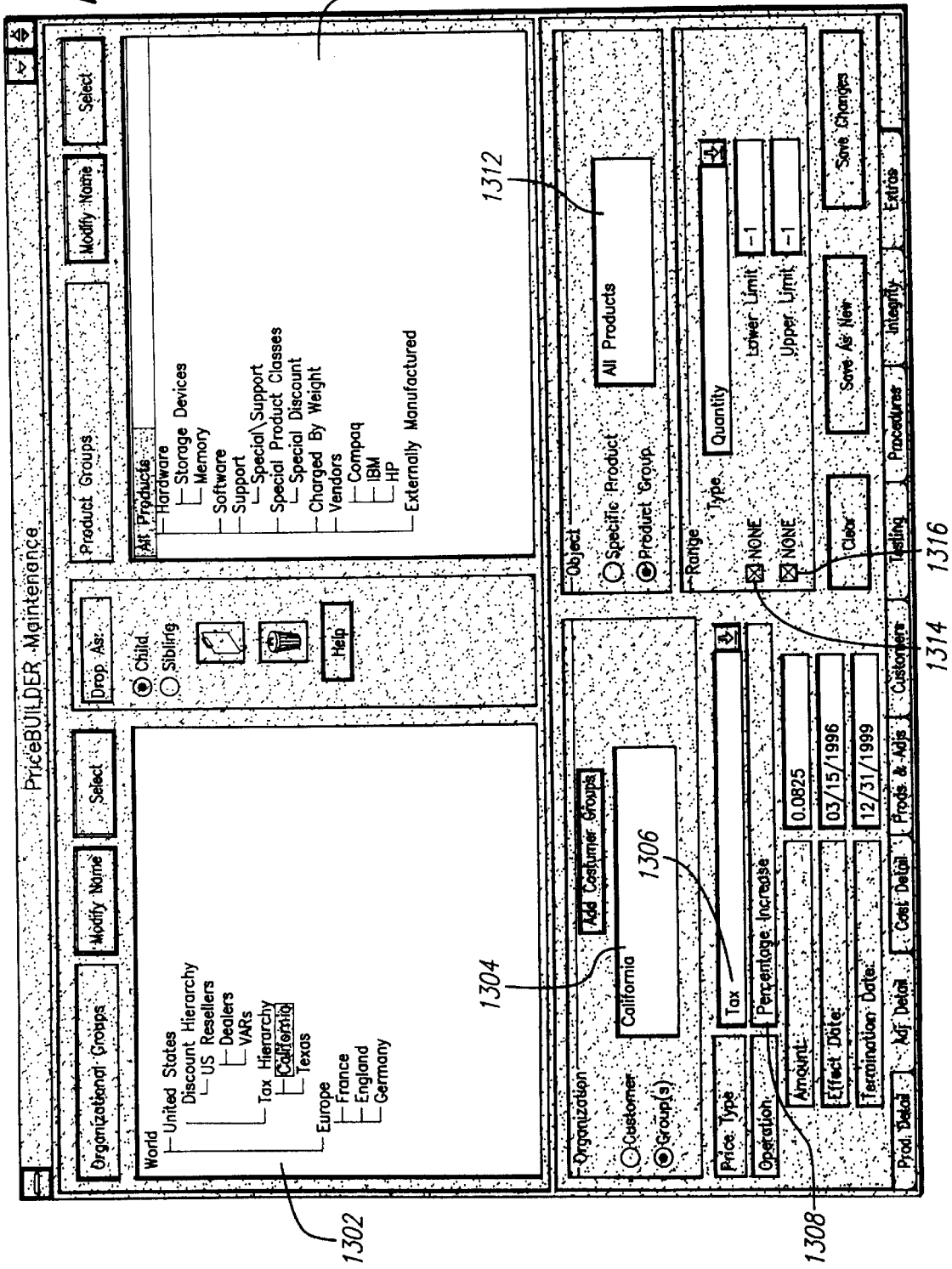
FIG. 13 is an example of a computer screen according to the present invention showing pricing adjustment details for a geographical organizational group and a product group, using a Tax pricing type.

As another example of the invention's simplification of the prior art's price and price adjustment tables, reference is made to the computer screen shown in FIG. 13. As shown in FIG. 13, the invention permits the user to select a tax rate for purchasing organizations located in various geographic locations. The invention permits a user to generate a desired geographic group in window 1302. In the example of FIG. 13, the user has specified one geographic group to be "California." The user then places the geographic designation "California" in box 1304 by "dragging" the group "California" and "dropping" it in box 1304. The Pricing Type that the user would select for specifying a tax rate is "Tax." Accordingly, the user would select "Tax" as the Pricing Type as shown in box 1306. The Operation corresponding to a "Tax" Pricing Type is a "Percentage Increase" as shown in box 1308. The user then specifies the "Amount" of the percentage increase to be "0.0825" (This is interpreted as an 8.25% tax rate by the present invention). The user then selects the product group to which this tax rate would apply. This is accomplished by "dragging" and "dropping" the product group "All Products" from window 1310 into box 1312. It is noted that an equal tax rate is usually applicable to all products. Thus, the appropriate product group to select is usually the "All Products" group. Furthermore, the tax rate is typically independent of the quantity or dollar volume of a purchase. The user specifies this by checking boxes 1314 and 1316 indicating that no conditional ranges apply. In other words, there are no applicable lower and upper quantity (or dollar volume) limits.

Figure 14:
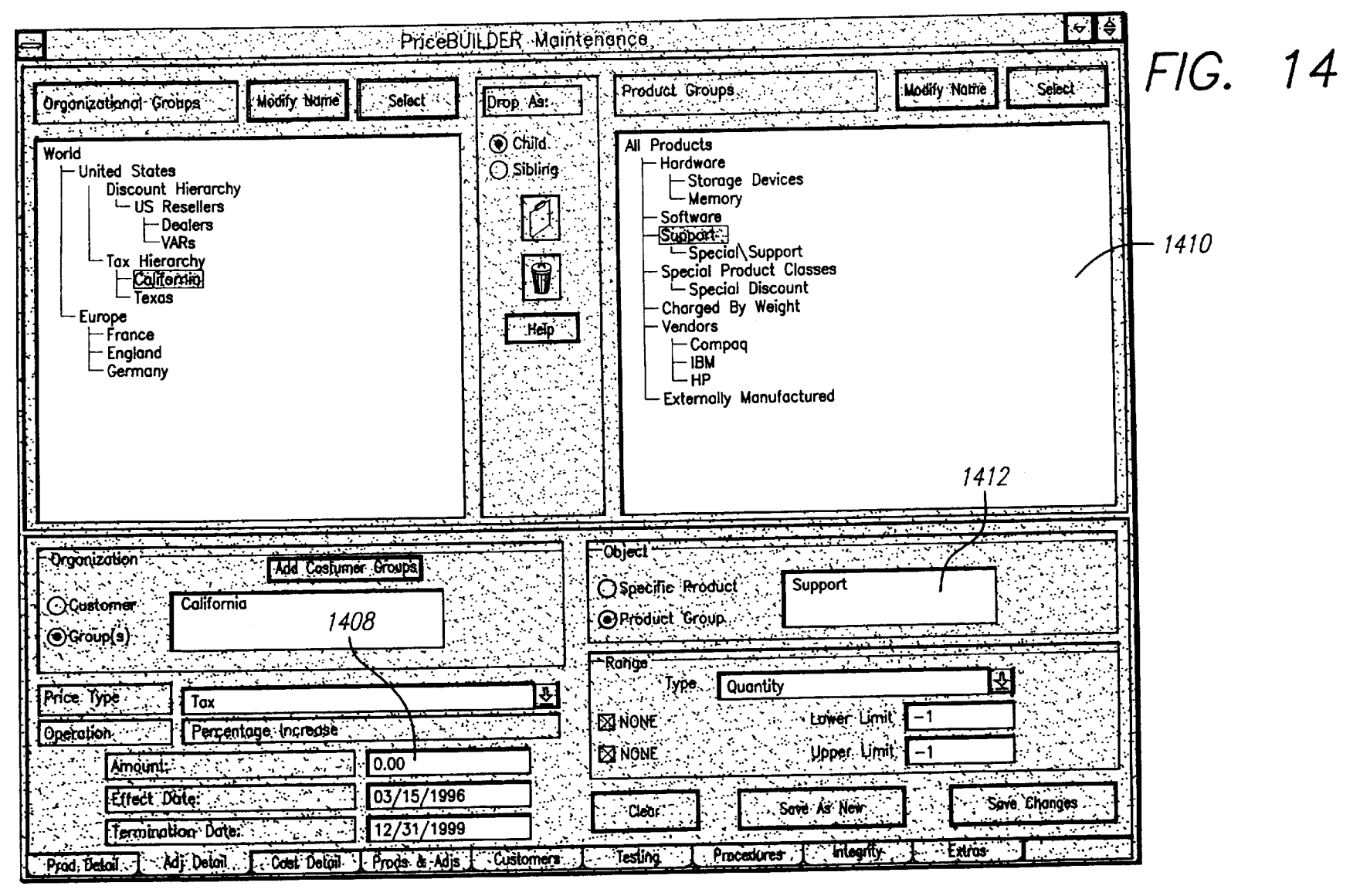

As stated above, the same tax rate usually applies equally to products in the group "All Products." However, there can be exceptions. FIG. 14 illustrates how the invention permits a user to effectively make exceptions to the general rule that the tax rate applies equally to every group in the "All Products" category. For example, a user may desire that services, such as consulting and support services, not be taxed. Consulting and support services may be categorized under the "Support" group shown in window 1410 of FIG. 14. The user "drags" and "drops" the Support group into box 1412. The user then specifies that the applicable tax rate for the "Support" group is 0%. This is shown as 0.00 in box 1408. The remaining information shown in FIG. 14 is the same as that shown in FIG. 13. Thus, every product group with the exception of the "Support" group in window 1410 is taxed at 8.25%. The reason is that the "Support" group tax rate overrides the tax rate designated at a higher level in the hierarchy. Thus, while every group (with the exception of the "Support" group) is taxed at the rate designated for the root group "All Products," the "Support" group is taxed at a different rate. This feature of the invention permits a user to carve out exceptions to situations typically calling for an equal treatment of some product and organizational groups.

Figure 15A:
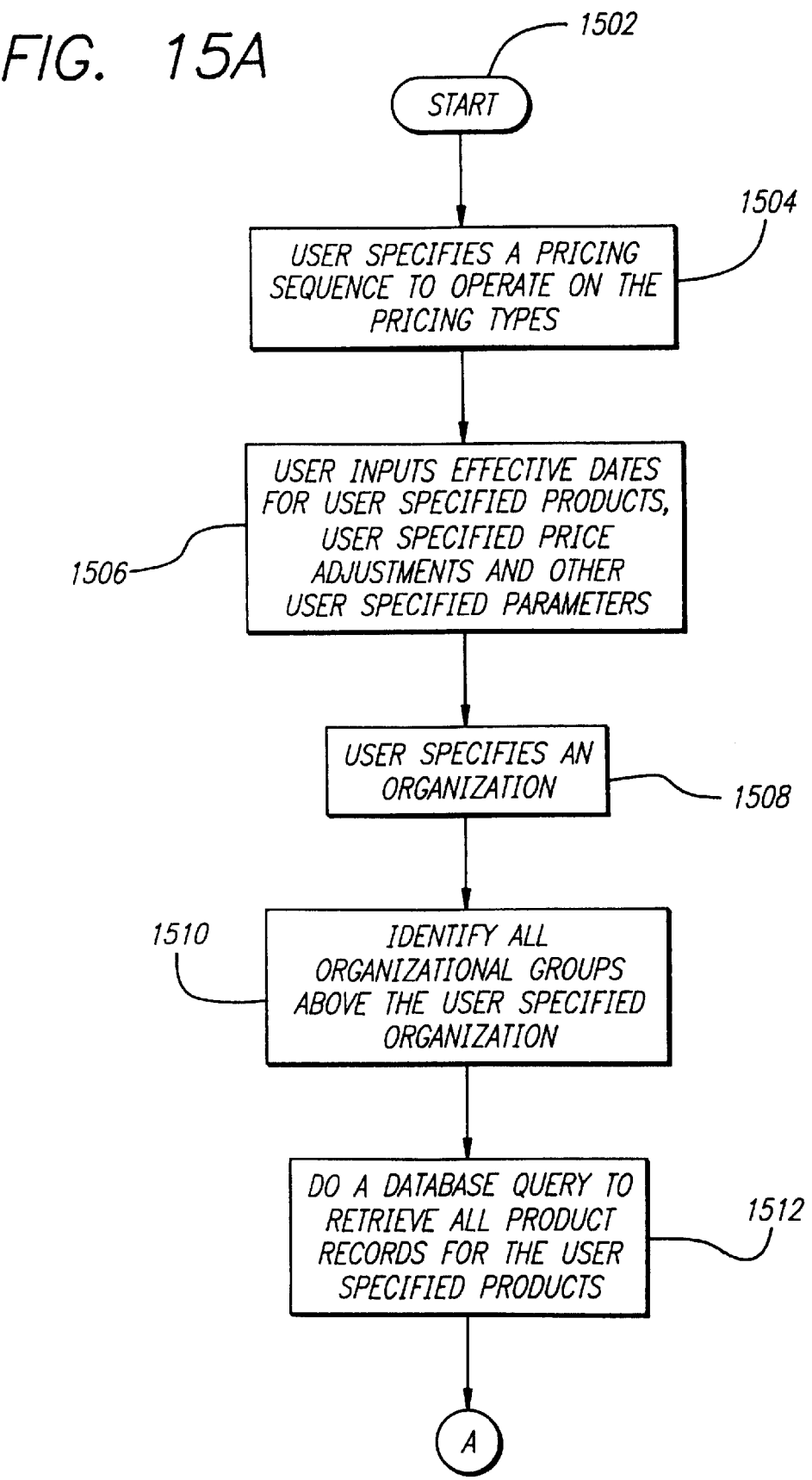
FIGS. 15A through 15C illustrate the execution flow according to the present invention.
Figure 15B:
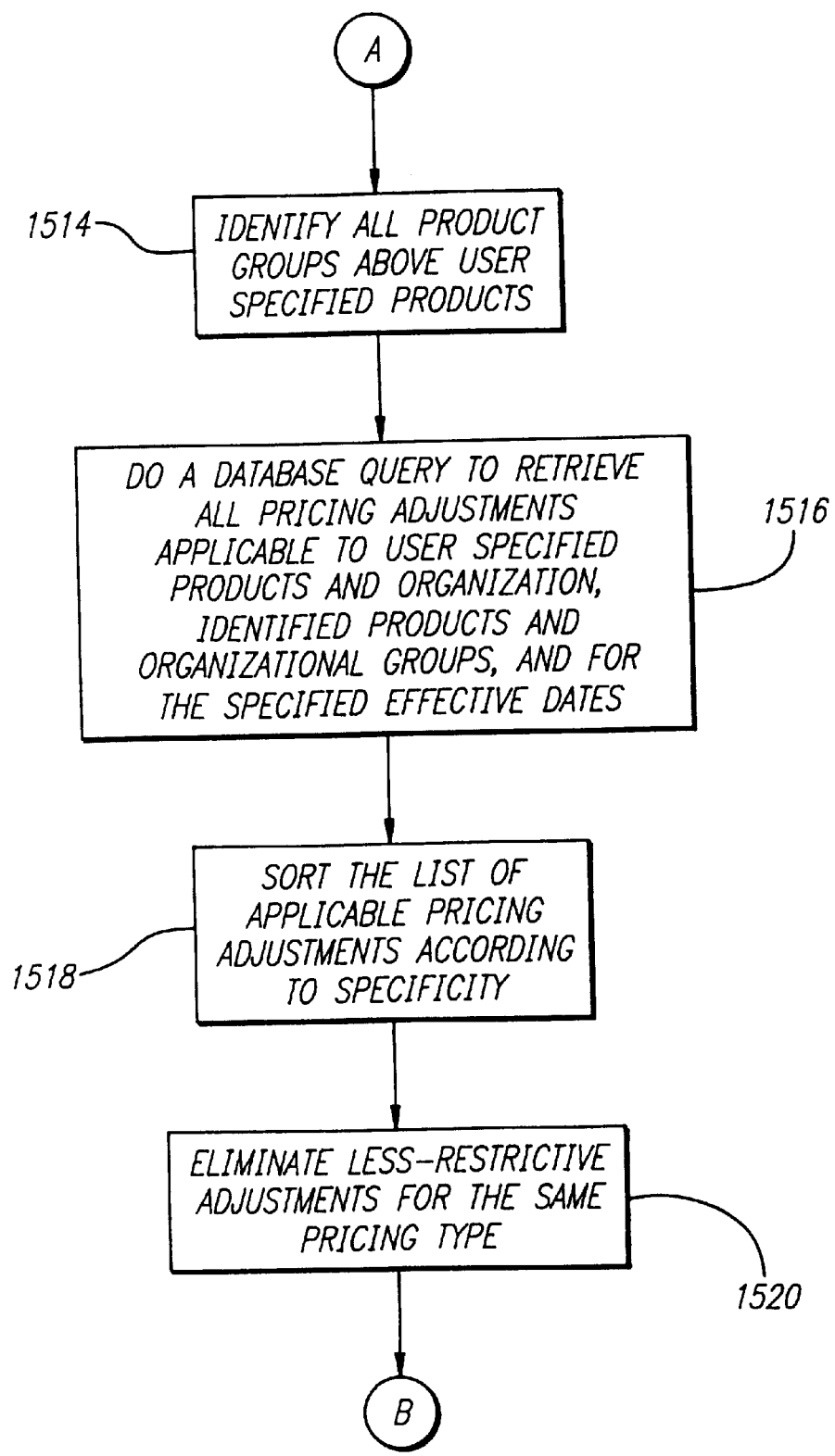
Figure 15C:
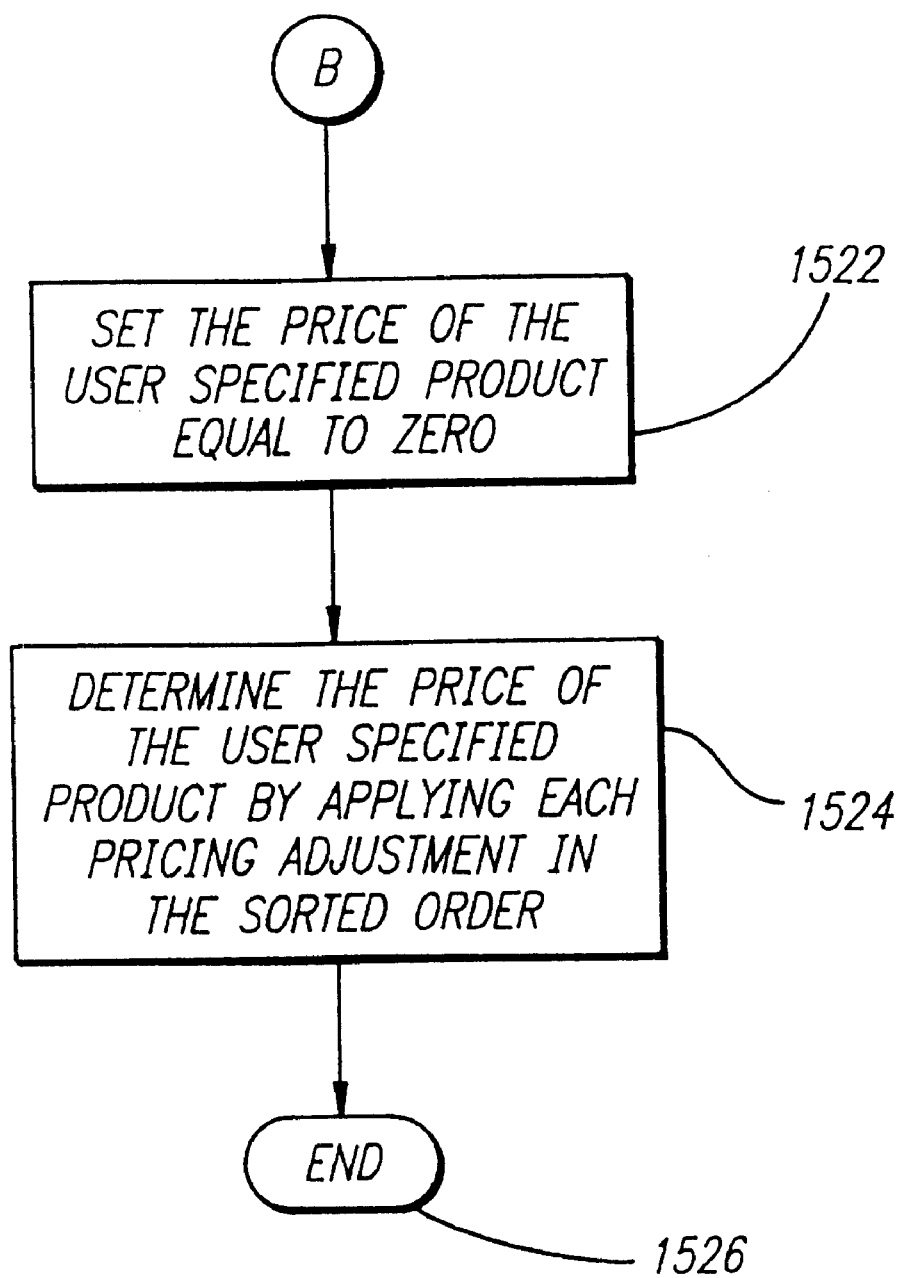

FIGS. 15A through 15C illustrate the execution flow of the present invention. The execution flow of the invention begins in step 1502. In step 1504 the user specifies a pricing sequence to operate on the various Pricing Types. For example, the user may specify a pricing sequence such as that shown in FIG. 8. This means that the List Price, Currency Conversion Percentage, Currency Conversion Factor, Customer Negotiated Discount, and Customer Negotiated Price are applied in the indicated sequence. Namely, the List Price is applied first and the Customer Negotiated Price is applied last. As stated above, a Tax Pricing Type is also typically applied. A Tax Pricing Type is typically near the end of a pricing sequence. In step 1506 the user specifies effective dates during which various price adjustments are applicable. In step 1506 the user specifies products, price adjustments or other user selected parameters. In step 1508 the user specifies the specific purchasing organization for the specific product. In step 1510, the present invention identifies all organizational groups that are higher than the user specified purchasing organization in the organizational hierarchy.

In step 1512 the present invention performs a database query for retrieving all product records related to user specified products. The database query is directed to user specified products, the user specified purchasing organization, the identified organizational groups, and the effective dates specified by the user. In step 1514 the invention identifies all product groups that are higher than user specified products in the product group hierarchy. In step 1516 the invention performs a database query for retrieving all pricing adjustments applicable to user specified products and the user specified organization. The query is also directed to retrieving all pricing adjustments applicable to identified products and organizational groups, and to the user specified effective dates. Each pricing adjustment consists of the application of those Pricing Types that apply to user specified products (and in the user specified pricing sequence).

In step 1518 the invention sorts the retrieved list of applicable pricing adjustments according to their respective specificities. First, the list of the pricing adjustments is sorted according to the sequence of the Pricing Types associated with each pricing adjustment. Second, the list of the pricing adjustments is sorted according to the product hierarchy. Pricing adjustments specified at a lower level of the product hierarchy are assumed to be more specific and are thus placed after the pricing adjustments specified at a higher level of the product hierarchy. Third, the list of pricing adjustments is sorted according to the organizational hierarchy. Pricing adjustments specified at a lower level of the organizational hierarchy are assumed to be more specific and are thus placed after the pricing adjustments specified at a higher level of the organizational hierarchy. Fourth, pricing adjustments with quantity range checks are placed after pricing adjustments with amount and volume range checks. Fifth, pricing adjustments with a higher low range criteria are placed after those with a lower low range criteria and pricing adjustments with a higher high range criteria are placed after those with a lower high range criteria.

In step 1520 the less restrictive pricing adjustments with the same Pricing Types are eliminated. In step 1522 the price of the user specified product is set to zero so that the price can be determined by application of the sorted pricing adjustments. In step 1524 the various Pricing Types included in the sorted pricing adjustments are applied in the user specified pricing sequence. Thus, the price of the user specified product is increased, decreased, and/or overridden until the final price is determined. In step 1526 the invention's execution flow ends.

Thus, a method and apparatus for pricing products in multi-level product and organizational groups is described.

What is claimed:

1. A method for determining a price of a product offered to a purchasing organization comprising:

identifying one or more organizational groups, Within a hierarchy of organizational groups, of which the purchasing organization is a member, wherein pricing information is (i) stored in a data source and (II) associated with one or more of the organizational groups;

retrieving from the data source the pricing information applicable to the one or more identified organizational groups;

identifying one or more product groups, within a hierarchy of product groups, of which the product is a member, wherein pricing information is (i) stored in a data source and (ii) associated with one or more of the product groups;

retrieving from the data source the pricing information applicable to the one or more identified product groups;

sorting the retrieved pricing information applicable to the one or more identified organizational groups and the one or more identified product groups according to pricing types, the hierarchy of product groups and the hierarchy of organizational groups; and eliminating any of the pricing information that is less restrictive for the same pricing type; and determining the price of the product using the sorted pricing information that is not eliminated.

2. The method of claim 1 wherein identifying the organizational groups comprises:

retrieving from the data source the identities of the one or more organizational groups of which the purchasing organization is a member.

3. The method of claim 1 wherein identifying the product groups comprises:

retrieving from the data source the identities of the one or more product groups of which the product is a member.

4. The method of claim 1 wherein the data source comprises a sorted hierarchy of organizational groups.

5. The method of claim 1 wherein the data source comprises a sorted hierarchy of product groups.

6. The method of claim 1 wherein the pricing information comprises pricing adjustments.

7. The method of claim 6 wherein the pricing adjustments comprise denormalized pricing adjustments.

8. The method of claim 6 wherein the pricing information comprises information specifying an order in which the pricing adjustments are to be applied to determine the price of the product.

9. The method of claim 1 wherein the pricing information applicable to the one or more identified organizational groups is applicable based at least in part on effective dates of the pricing information, and the pricing information applicable to the one or more identified product groups is applicable based at least in part on effective dates of the pricing information.

10. The method of claim 1 wherein the pricing information applicable to the organizational groups is stored in a single table in the data source.

11. The method of claim 10 wherein the pricing information applicable to the product groups is stored in a single table in the data source.

12. The method of claim 1 wherein each of the one or more organizational groups includes multiple purchasing organizations.

13. The method of claim 1 wherein each of the one or more product groups includes multiple products.

14. The method of claim 1 wherein each of the one or more organizational groups are selected from the group comprising: World, U.S., Europe, Small, Medium, Large, Reseller, and End-User.

15. The method of claim 1 wherein each of the one or more product groups are selected from the group comprising: Hardware, CPU, Software, Support, and Vendors.

16. A computer readable storage media comprising: computer instructions to implement the method of claim 1.

17. A method for determining a price of a product offered to a purchasing organization comprising:

arranging a hierarchy of organizational groups comprising a plurality of branches such that an organizational group below a higher organizational group in each of the branches is a subset of the higher organizational group;

arranging a hierarchy of product groups comprising a plurality of branches such that a product group below a higher product group in each of the branches in a subset of the higher product group;

storing pricing information in a data source, wherein the pricing information is associated, with (i) a pricing type, (ii) the organizational groups, and (iii) the product groups;

retrieving applicable pricing information corresponding to the product, the purchasing organization, each product group above the product group in each branch of the hierarchy of product groups in which the product is a member, and each organizational group above the purchasing organization in each branch of the hierarchy of organizational groups in which the purchasing organization is a member;

sorting the pricing information according to the pricing types, the product, the purchasing organization, the hierarchy of product groups, and the hierarchy of organizational groups;

eliminating any of the pricing information that is less restrictive; and determining the product price using the sorted pricing information.

18. The method of claim 17 wherein the product is located in at least two branches of the hierarchy of product groups.

19. The method of claim 18 wherein the purchasing organization is located in at least two of the branches of the hierarchy of organizational groups.

20. The method of claim 18 wherein the pricing information applicable to the product and each product group above the product in each branch of the hierarchy of product groups in which the product is located are retrieved utilizing a query to a data source in which the pricing information is stored.

21. The method of claim 17 wherein the purchasing organization is located in at least two of the branches of the hierarchy of organizational groups.

22. The method of claim 21 wherein the pricing information applicable to the purchasing group and each organizational group above the purchasing group in each branch of the hierarchy of organizational groups in which the purchasing group is located are retrieved utilizing a query to a data source in which the pricing information is stored.

23. The method of claim 17 wherein the pricing information is applied according to an applicable price adjustment sequence.

24. The method of claim 17 wherein the pricing information comprises denormalized pricing adjustments.

25. The method of claim 17 wherein the pricing information applicable to the product and each product group above the product in each branch of the hierarchy of product groups in which the product is located are retrieved utilizing a query to a data source in which the pricing information is stored.

26. A computer readable storage media comprising: computer instructions to implement the method of claim 17.

27. A computer implemented method for determining a price of a product offered to a purchasing organization comprising:

retrieving from a data source pricing information that is (i) applicable to the purchasing organization and (ii) from one or more identified organizational groups, within a hierarchy of organizational groups, of which the purchasing organization is a member;

retrieving from the data source pricing information that is (i) applicable to the product and (ii) from one or more identified product groups, within a hierarchy of product groups, of which the product is a member; and receiving the price of the product determined using pricing information applicable to the one or more identified organizational groups and the one or more identified product groups according to the hierarchy of product groups and the hierarchy of organizational groups.

28. A computer readable storage media comprising: computer instructions to implement the method of claim 27.

29. An apparatus for determining a price of a product offered to a purchasing organization comprising:

a processor;

a memory coupled to the processor, wherein the memory includes computer program instructions capable of:

retrieving from a data source pricing information that is (i) applicable to the purchasing organization and (ii) from one or more identified organizational groups, within a hierarchy of organizational groups, of which the purchasing organization is a member;

retrieving from the data source pricing information that is (i) applicable to the product and (ii) from one or more identified product groups, within a hierarchy of product groups, of which the product is a member; and receiving the price of the product determined using pricing information applicable to the one or more identified organizational groups and the one or more identified product groups according to the hierarchy of product groups and the hierarchy of organizational groups.

30. An apparatus for determining a price of a product offered to a purchasing organization comprising:

means for retrieving from a data source pricing information that is (i) applicable to the purchasing organization and (ii) from one or more identified organizational groups, within a hierarchy of organizational groups, of which the purchasing organization is a member;

means for retrieving from the data source pricing information that is (i) applicable to the product and (ii) from one or more identified product groups, within a hierarchy of product groups, of which the product is a member; and means for receiving the price of the product determined using pricing information applicable to the one or more identified organizational groups and the one or more identified product groups according to the hierarchy of product groups and the hierarchy of organizational groups.

31. An apparatus for determining a price of a product offered to a purchasing organization comprising:

means for arranging a hierarchy of organizational groups comprising a plurality of branches such that an organizational group below a higher organizational group in each of the branches is a subset of the higher organizational group;

means for arranging a hierarchy of product groups comprising a plurality of branches such that a product group below a higher product group in each of the branches in a subset of the higher product group;

means for storing pricing information in a data source, wherein the pricing information is associated with (i) a pricing type, (ii) the organizational groups, and (iii) the product groups;

means for retrieving applicable pricing information corresponding to the product, the purchasing organization, each product group above the product group in each branch of the hierarchy of product groups in which the product is a member, and each organizational group above the purchasing organization in each branch of the hierarchy of organizational groups in which the purchasing organization is a member;

means for sorting the pricing information according to the pricing types, the product, the purchasing organization, the hierarchy of product groups, and the hierarchy of organizational groups;

means for eliminating any of the pricing information that is less restrictive; and means for determining the product price using the sorted pricing information.

* * * * *